(12) United States Patent
Purohit et al.

(10) Patent No.: US 11,851,725 B2
(45) Date of Patent: Dec. 26, 2023

(54) IRONMAKING FEEDSTOCK

(71) Applicants: Swinburne University of Technology, Hawthorn (AU); Commonwealth Scientific and Industrial Research Organisation, Acton (AU)

(72) Inventors: Suneeti Purohit, Hawthorn (AU); Geoffrey Brooks, Tecoma (AU); Muhammad Akbar Rhamdhani, Sydenham (AU); Mark Pownceby, Upwey (AU)

(73) Assignees: Swinburne University of Technology, Hawthorn (AU); Commonwealth Scientific and Industrial Research Organisation, Acton (AU)

( * ) Notice: Subject to any disclaimer, the term of this patent is extended or adjusted under 35 U.S.C. 154(b) by 0 days.

(21) Appl. No.: 17/938,104

(22) Filed: Oct. 5, 2022

(65) Prior Publication Data
US 2023/0049624 A1    Feb. 16, 2023

Related U.S. Application Data

(62) Division of application No. 16/858,916, filed on Apr. 27, 2020, now abandoned.

(60) Provisional application No. 62/842,567, filed on May 3, 2019.

(51) Int. Cl.
C21B 5/00    (2006.01)
C22B 1/24    (2006.01)
C22B 1/04    (2006.01)

(52) U.S. Cl.
CPC ............... C21B 5/008 (2013.01); C22B 1/04 (2013.01); C22B 1/2406 (2013.01)

(58) Field of Classification Search
CPC ..... C21B 5/00; C21B 5/08; C22B 1/00; C22B 1/14; C22B 1/16; C22B 1/18
See application file for complete search history.

(56) References Cited

U.S. PATENT DOCUMENTS

| 4,248,624 A * | 2/1981 | Novoa ............... C21B 5/008 75/472 |
| 2004/0107800 A1* | 6/2004 | Nayak ............... C22B 7/02 75/770 |
| 2020/0347467 A1 | 11/2020 | Purohit |

OTHER PUBLICATIONS

Ji-Won Jeon, Sung-Mo Jung and Yasushi Sasaki, Formation of Calcium Ferrites under Controlled Oxygen Potentials at 1273 K, ISIJ International, vol. 50 (2010), No. 8, pp. 1064-1070 (Year: 2010).*

Sato, Shuji; Kikuchi, Takeshi; Yoshii, Chikao, Reduction Tests of Synthetic Calcium Ferrites: in Ternary Systems of CaO—FeO—Fe2O3, Mar. 20, 1971, Hokkaido University (Year: 1971).*

(Continued)

*Primary Examiner* — Vanessa T. Luk
*Assistant Examiner* — Nikolas Takuya Pullen
(74) *Attorney, Agent, or Firm* — Stevens & Showalter LLP

(57) ABSTRACT

The present invention relates to an ironmaking feedstock comprising a solid $CaFe_3O_5$ phase. The ironmaking feedstock may be produced by a process comprising reacting a combination of a calcium source and magnetite at elevated temperature under reducing conditions sufficient to produce the solid $CaFe_3O_5$ phase. The product may be in the form of agglomerates such as pellets, with a compressive strength such that the product is suitable for transportation.

18 Claims, 14 Drawing Sheets

(56) References Cited

OTHER PUBLICATIONS

Stanisława Jasienska, Jadwiga Orewczyk, Andrzej Łedzki, Jarosław Durak. Effect of reduction conditions on structure and phase composition of blast furnace charge composed of alkaline sinters and acidic pellets, 1999, Solid State Ionics 117 p. 129-143 (Year: 1999).*

Pullen, Nikolas Takuya; Office Action dated Jul. 6, 2022; U.S. Appl. No. 16/858,916; United States Patent and Trademark Office; Alexandria, Virginia.

* cited by examiner

FIG. 12A
FIG. 12B
FIG. 12C
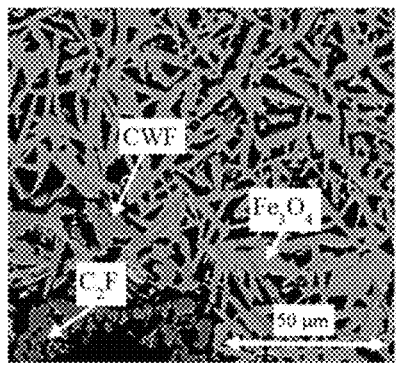
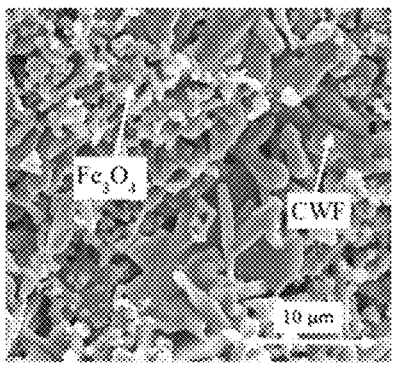
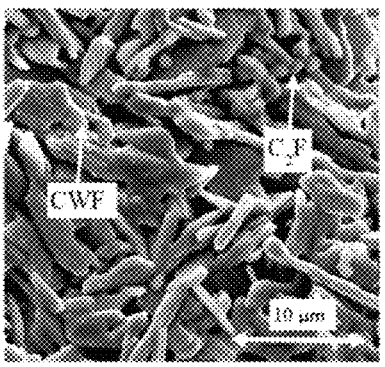
FIG. 13A
FIG. 13B
FIG. 13C
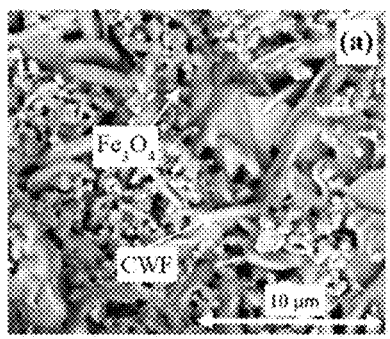
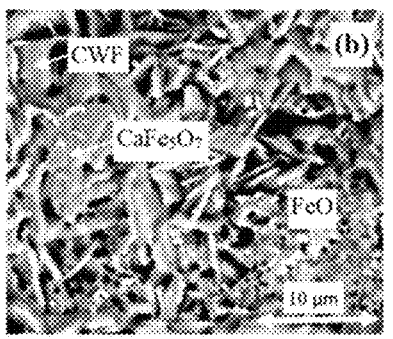
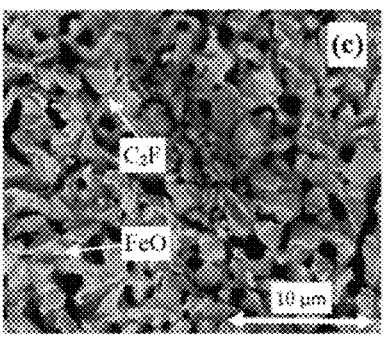
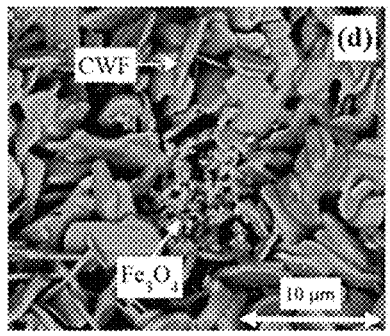
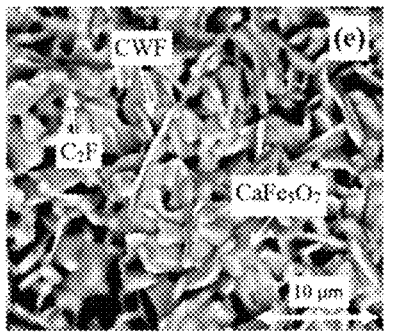
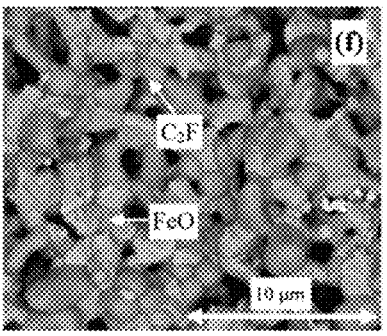
FIG. 13D
FIG. 13E
FIG. 13F

IRONMAKING FEEDSTOCK

CROSS REFERENCE TO RELATED APPLICATION

This application is a divisional of U.S. patent application Ser. No. 16/858,916, filed Apr. 27, 2020, which claims the benefit of U.S. Provisional Patent Application No. 62/842,567, filed May 3, 2019, entitled "IRONMAKING FEEDSTOCK," the entire disclosures of which are hereby incorporated by reference herein.

FIELD OF THE INVENTION

The present application relates to ironmaking feedstocks and processes for their production. The present application relates in particular to ironmaking feedstocks derived from magnetite ores, and the production of ironmaking feedstocks from magnetite.

BACKGROUND OF THE INVENTION

Iron is among the most abundant materials on earth existing mostly in the form of oxides, hydroxides and carbonates due to its high reactivity towards water and oxygen. Not all of the iron minerals, however, are suitable for iron production and the minerals with higher iron content such as hematite, magnetite and goethite are commercially used by the iron making industries. Over the past few decades, the iron making industry has consumed most of the high-grade hematite lump ore as the main source of iron ore feed for the blast furnace. As a result, premium quality hematite ores are less available, and the available ores contain higher levels of impurities.

Due to the unavailability of direct shipping hematite ores, the current blast furnace iron-making practice mostly relies on sinters, produced from the agglomeration of iron ore fines. The goethite ores are softer and typically lead to increased generation of fines requiring sintering. They are also generally sticky due to the presence of moisture that creates significant problems in both processing and transportation. In this situation, of the three main iron ore feedstocks available, magnetite ore remains the most unexploited with recent surveys indicating abundant available ore which has a great potential to be used in the iron making industries. Typically, however, magnetite ores contain between 15 to 40% iron (the theoretical Fe limit is 72.36% iron) due to high levels of gangue mineral impurities and cannot be used directly for iron making. However, after beneficiation, the magnetite concentrates can contain more than 65% of iron and low amounts of phosphorous and sulphur, making these concentrates an attractive feed for blast furnace operations [Davies and Twining].

Current practice of iron-making from magnetite concentrate involves a pelletisation process before reduction (shown in FIG. 1). During pelletisation, magnetite pellets undergo an oxidation roasting process, which involves four different stages: drying, preheating (800 to 900° C.), induration (1200 to 1350° C.) and cooling, and the magnetite is oxidised to hematite according to Equation 1 [Forsmo et al.].

$$4Fe_3O_4+O_2=6Fe_2O_3 \; \Delta H=-119 \text{ kJ/mol} \tag{1}$$

The reason for the re-oxidation of the magnetite pellets is that, if charged directly to reduction units to produce iron without roasting, the magnetite will form an intermediate wustite (FeO) layer at temperatures above the wustite eutectoid temperature (570° C.) [Hayes]. Depending upon the temperature, reduction potential and type of reductant, the wustite layer is then reduced to either a porous or dense iron layer. For the case of a $CO/CO_2$ gas mixture, the magnetite reduction rate is an order of magnitude smaller and has less pore formation compared to that by a $H_2/H_2O$ gas mixture [Hayes]. The resulting dense layer of iron at surface hinders the reduction of the core and results in an inhomogeneous microstructure. On the other hand, magnetite obtained during the stage-wise reduction of hematite has greater porosity because of its volumetric expansion [Deo et al.]. Hence, magnetite is peroxidised to hematite prior to its reduction.

The practise of oxidation roasting of magnetite before reduction, however, is carbon intensive and a significant emissions reduction of about 145 to 160 kg of $CO_2$ per tonne of iron production could be achieved when magnetite is directly charged to the blast furnace without being roasted. One way of direct charging of magnetite to the reduction unit is via a flash smelting process [Abdelghany et al.]. In addition, bath smelting processes such as HIsmelt and HIsarna and composite pellet processes like ITmk3 are reported to have potential for running entirely on magnetite feedstocks without the need of induration roasting, but these processes have not been progressed beyond the pilot stage [Meijer et al. and Anameric et al.].

Given the limitations with current magnetite usage in iron making, and the high carbon emissions profile involved in those processes, there is a need for new products and processes that make better use of magnetite as an ironmaking feedstock for ironmaking processes.

SUMMARY OF THE INVENTION

According to the present application, there is provided an ironmaking feedstock comprising a solid $CaFe_3O_5$ phase.

According to the present application, there is also provided process for the production of an ironmaking feedstock, the process comprising reacting a combination of a calcium source and magnetite at elevated temperature under reducing conditions sufficient to produce a solid $CaFe_3O_5$ phase.

Having considered the problems associated with magnetite ores in ironmaking processes, the inventors considered the possibility of reacting magnetite with a calcium source to form a treated magnetite material containing a significant $CaFe_3O_5$ phase, otherwise referred to as a CWF phase, which avoids the need to oxidise of magnetite ores to produce a hematite structure prior to use in iron production. CWF refers to calcia-wustite-ferrite, or CaO—FeO—$Fe_2O_3$ (i.e. $CaFe_3O_5$), and the terms CWF and $CaFe_3O_5$ are used interchangeably herein. The term "LMP" has also been used as a short-hand reference to an ironmaking feedstock in pellet form that has been produced in accordance with embodiments of the invention, also described as "lime-magnetite-pellets". To be suitable for use in subsequent ironmaking, the treated magnetite product needs to have good physical properties (i.e. be capable of transport, and therefore capable of formation into pellets or another agglomerated product, with low friability) and to be suitably reactive so that it can subsequently be used effectively as an iron feedstock in ironmaking. It would also be advantageous for the new feedstock to have a better emissions profile in terms of $CO_2$ emissions for ironmaking processes, from the stage of mineral processing to final iron production. Through a considerable program of research, it was found that it was possible to convert the magnetite phase at least partly, and depending on the conditions, substantially, into the $CaFe_3O_5$ structure, and it was also found that there are several advantages to the process, especially when considering the overall $CO_2$ emissions. The inventors studied the conditions required to effect the formation of the solid $CaFe_3O_5$ phase, how the process conditions impact on the production of this phase, and they also studied the physical properties and characteristics of the product to ensure its suitability for use as an ironmaking feedstock in subsequent ironmaking processes. Through this work various features of a new ironmaking feedstock and the process for its production were identified.

The abbreviations used in FIGS. 2 to 5 are as follows: C=CaO, F=$Fe_2O_3$; W=FeO; WF=$Fe_3O_4$; CWF=$CaFe_3O_5$; $C_2F$=$Ca_2Fe_2O_5$; $Ca_4F_4$=$Ca_4FegO_{17}$; M=Solid Solutions of C, F & W; $S_L$=Liquid Slag; FCC-$A_1$=Austenite form of Fe; BCC-$A_1$=Ferrite and high temperature delta phase of Fe.

Figure 6:
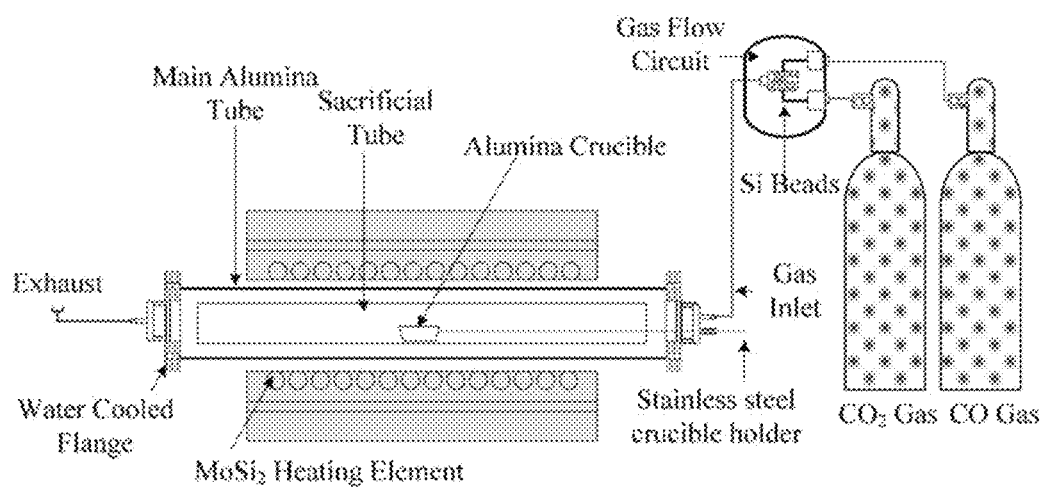

FIG. 6 is a schematic diagram of the experimental apparatus used to make generate the CWF in accordance with embodiments of the invention.

Figure 7:
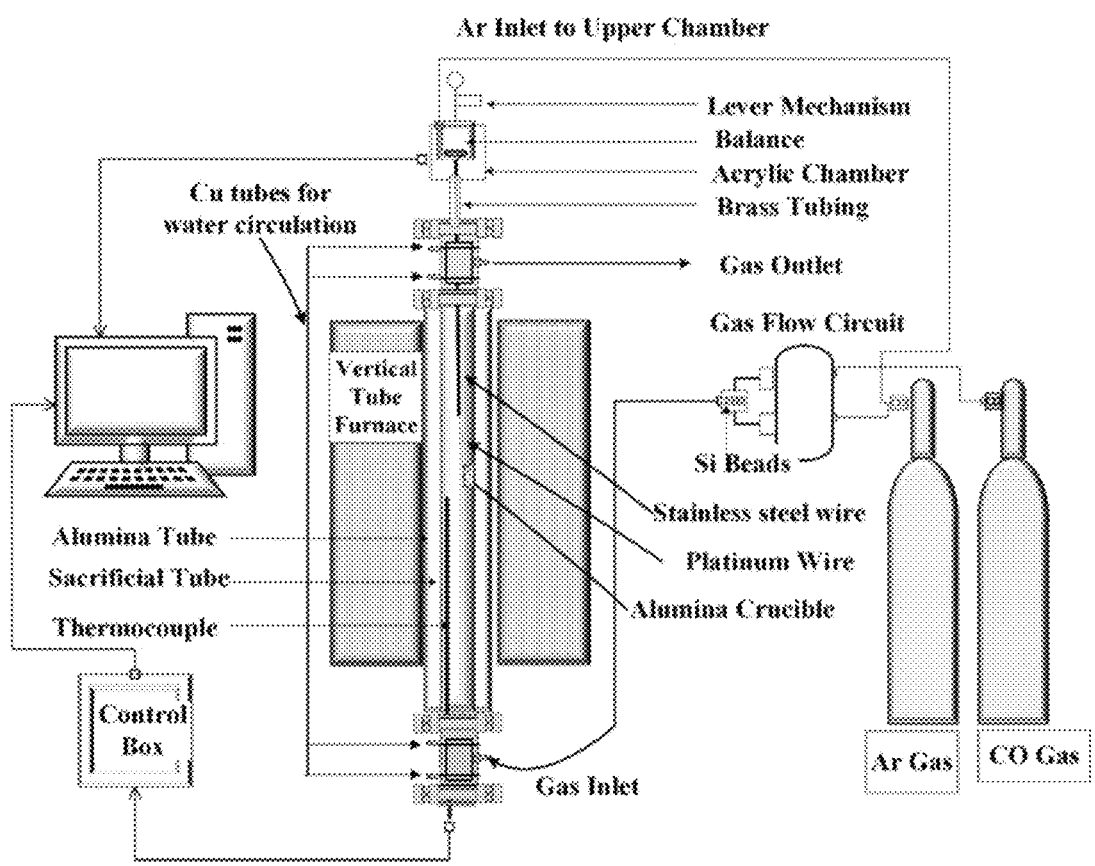

FIG. 7 is a schematic diagram of the thermogravimetric analysis apparatus used in the experimental procedure.

Figure 8:
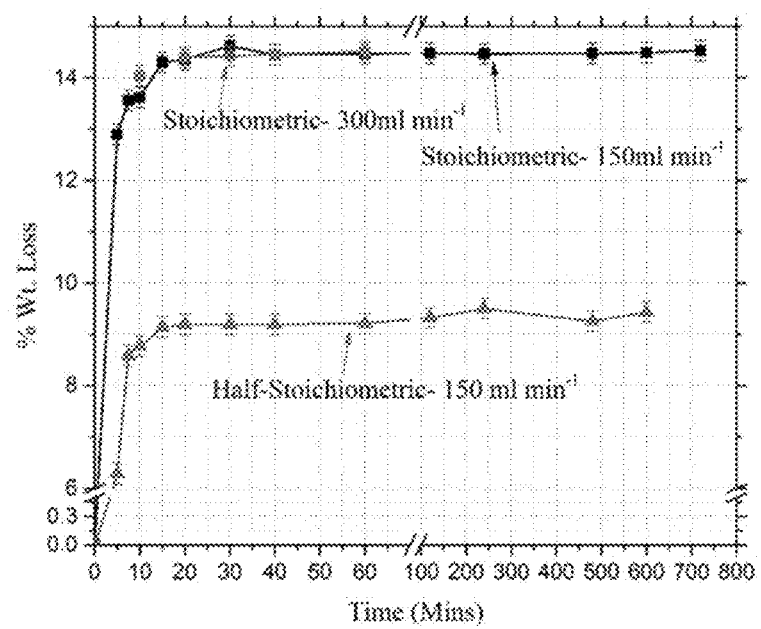

FIG. 8 is a graph showing weight loss results of stoichiometric LMPs and half-stoichiometric LMPs.

Figure 9A:
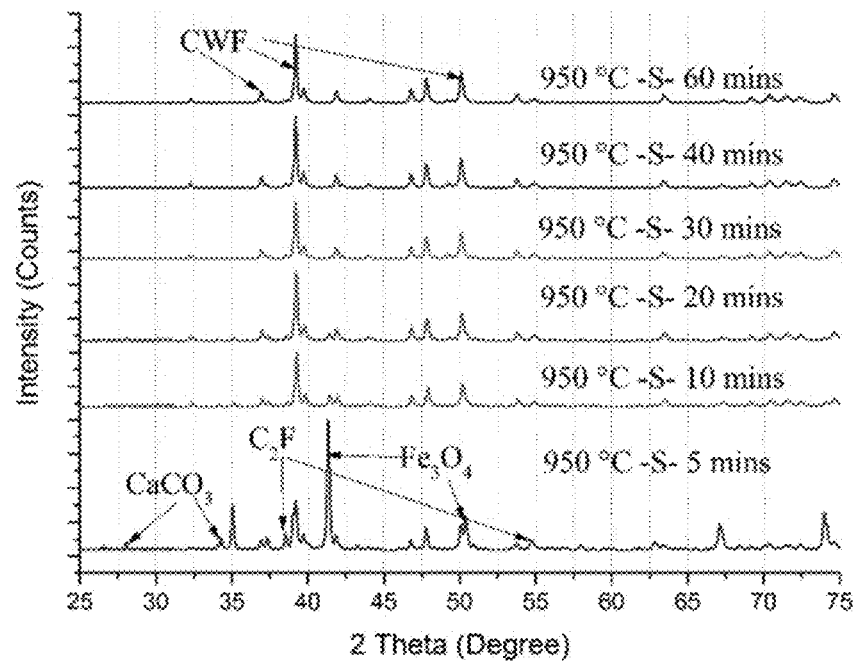

FIG. 9A provides XRD data collected for 950° C. heated stoichiometric LMPs.

Figure 9B:
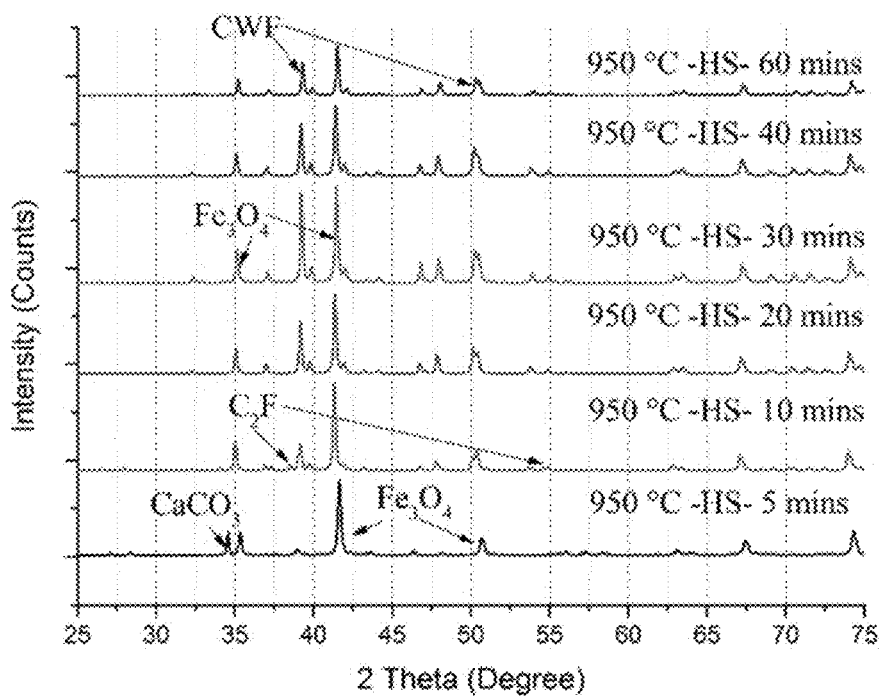

FIG. 9B provides XRD data collected for 950° C. heated half-stoichiometric LMPs of example 2.

Figure 10A:
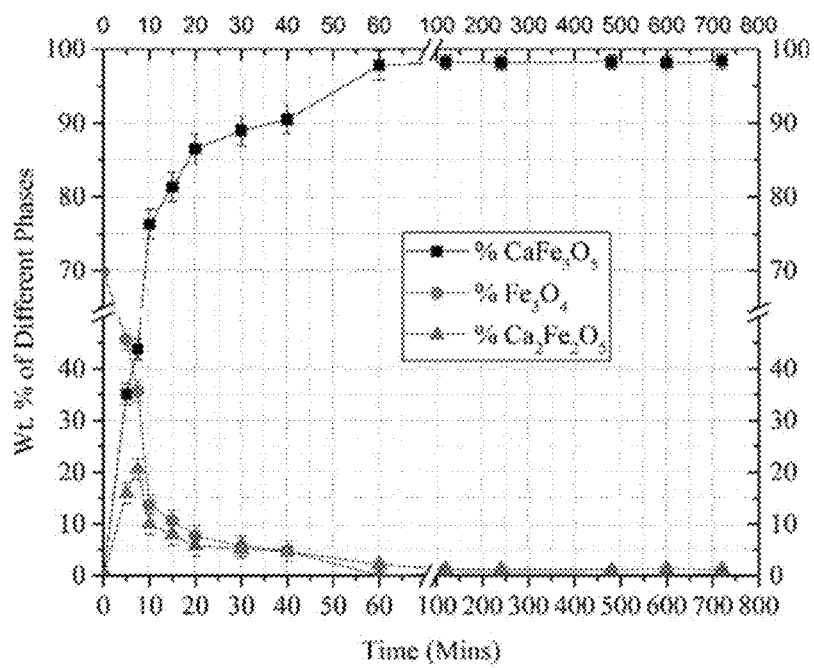

FIG. 10A provides a graphical representation of the results of Rietveld refinement-based QPA for 950° C. heated stoichiometric LMPs.

Figure 10B:
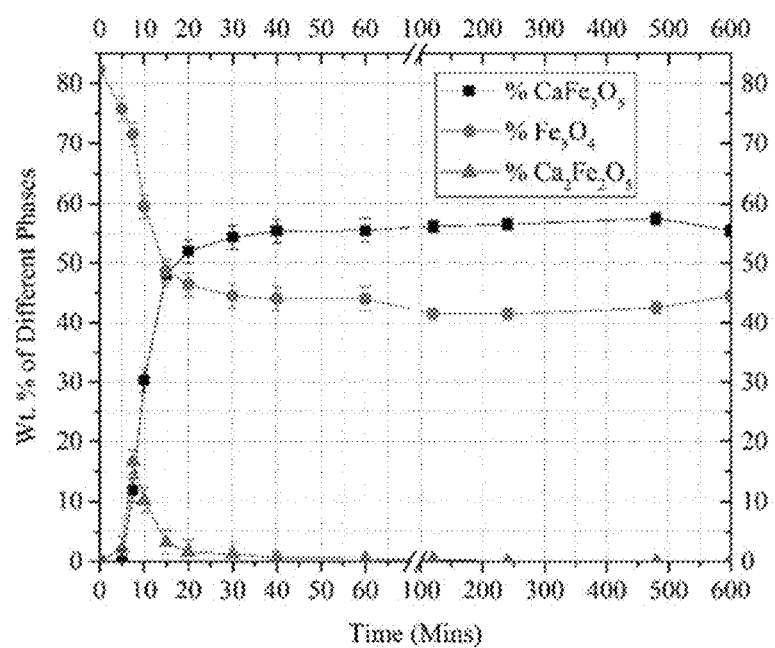

FIG. 10B provides a graphical representation of the results of Rietveld refinement-based QPA for 950° C. heated half stoichiometric LMPs of example 2.

Figure 11A:
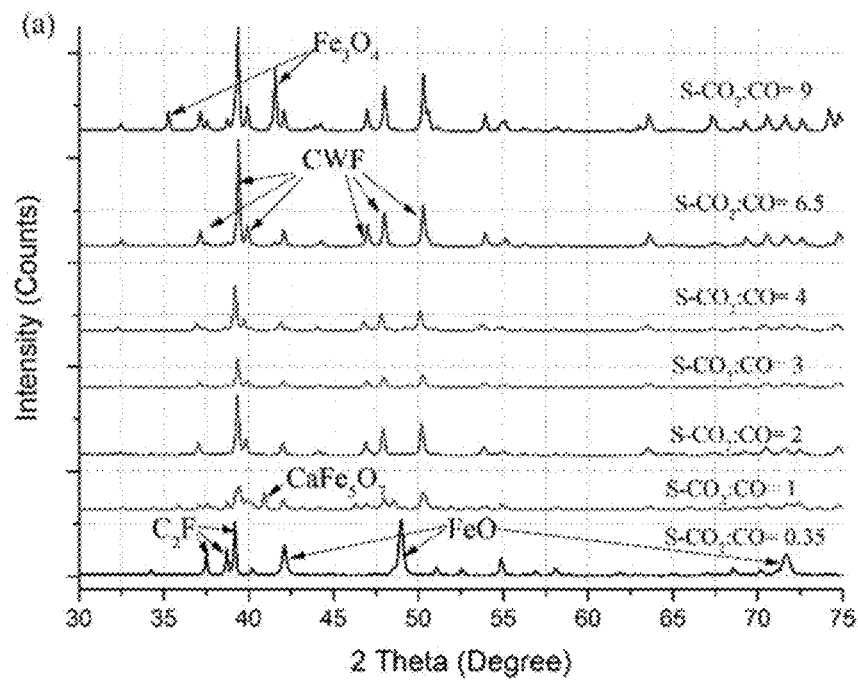

FIG. 11A provides XRD patterns collected for stoichiometric LMPs of example 2, heated at 950° C. for 30 min at $CO_2$/CO ratio of 0.35, 1, 2, 3, 4, 6.5 and 9.

Figure 11B:
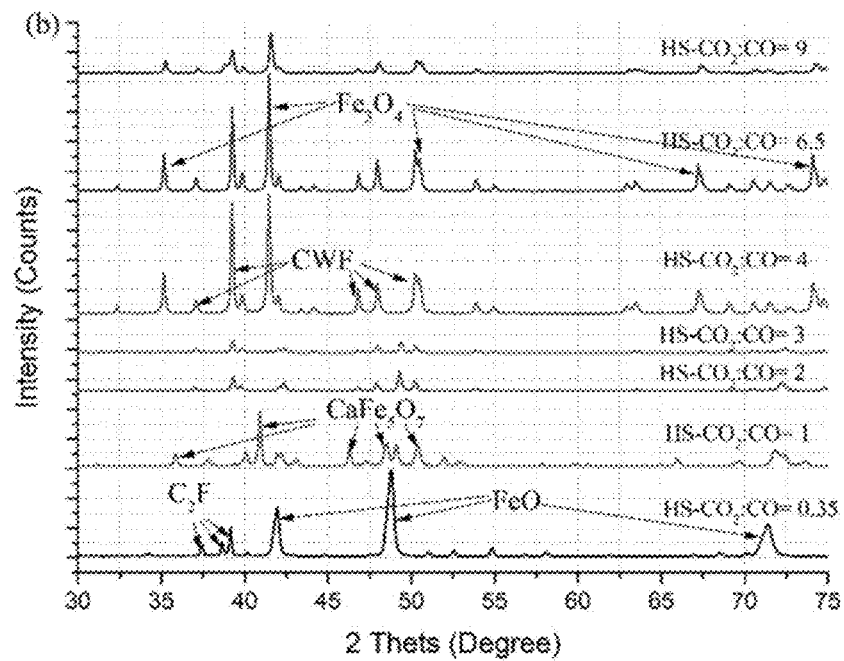

FIG. 11B provides XRD patterns collected for half stoichiometric LMPs of example 2, heated at 950° C. for 30 min at $CO_2$/CO ratio of 0.35, 1, 2, 3, 4, 6.5 and 9.

FIG. 12A provides BSE micrograph of half-stoichiometric LMP of example 2 heated to 950° C. for 20 min.

FIG. 12B provides SE micrograph of half-stoichiometric LMP of example 2 heated to 950° C. for 60 min.

FIG. 12C provides SE micrograph of stoichiometric LMP of example 2 heated to 950° C. for 60 min.

FIG. 13A provides Backscattered electron micrographs of 950° C.-30 min heated half-stoichiometric LMPs of example 2 at $p_{O_2}$=5.5×10$^{-14}$, $CO_2$/CO=6.5.

FIG. 13B provides Backscattered electron micrographs of 950° C.-30 min heated half-stoichiometric LMPs of example 2 at $p_{O_2}$=9.8×10$^{-16}$, $CO_2$/CO=1.

FIG. 13C provides Backscattered electron micrographs of 950° C.-30 min heated half-stoichiometric LMPs of example 2 at $p_{O_2}$=1.9×10$^{-16}$, $CO_2$/CO=0.35.

FIG. 13D provides Backscattered electron micrographs of 950° C.-30 min heated stoichiometric LMPs at $p_{O_2}$=5.5×10$^{-14}$, $CO_2$/CO=6.5.

FIG. 13E provides Backscattered electron micrographs of 950° C.-30 min heated stoichiometric LMPs at $p_{O_2}$=9.8×10$^{-16}$, $CO_2$/CO=1.

FIG. 13F provides Backscattered electron micrographs of 950° C.-30 min heated stoichiometric LMPs at $p_{O_2}$=1.9×10$^{-16}$, $CO_2$/CO=0.35.

Figure 14:
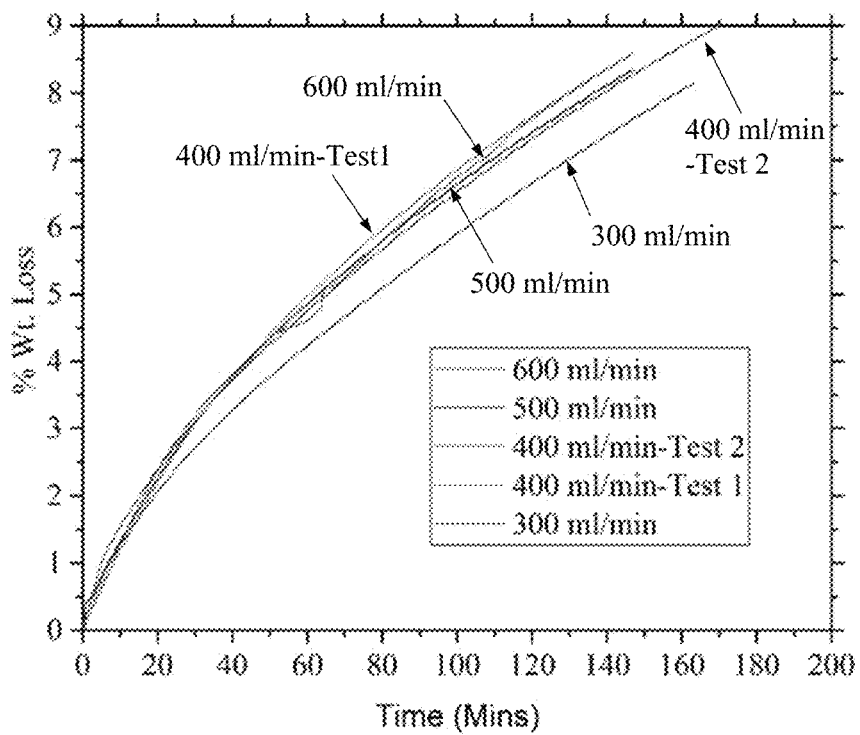

FIG. 14 is a graphical representation showing the effect of gas (CO+Argon) flowrate on the reduction of $Fe_2O_3$ pellets.

Figure 15:
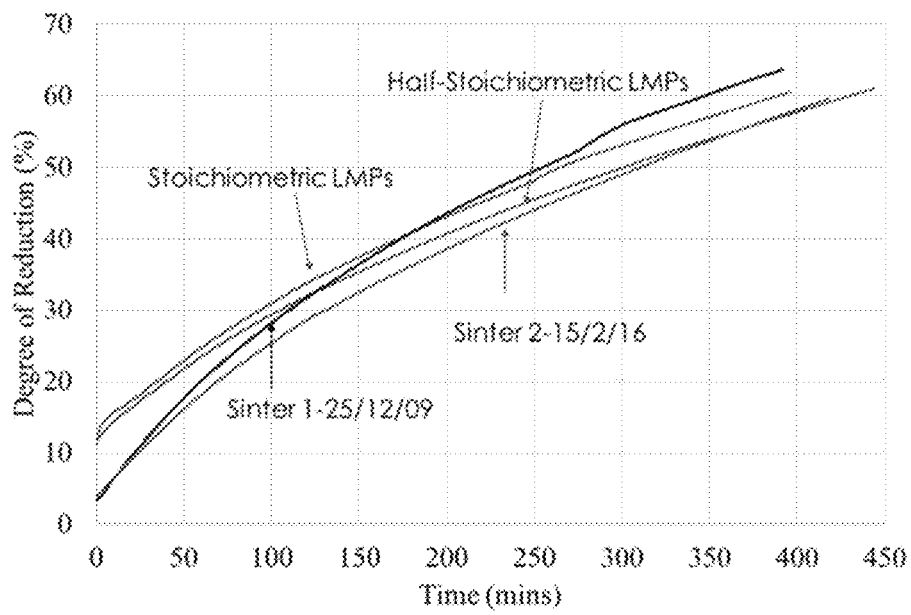

FIG. 15 is a graphical representation showing the Degree of Reduction vs Time plot for LMPs of example 2 in accordance with embodiments of the invention, and sinters of the prior art.

Figure 16:
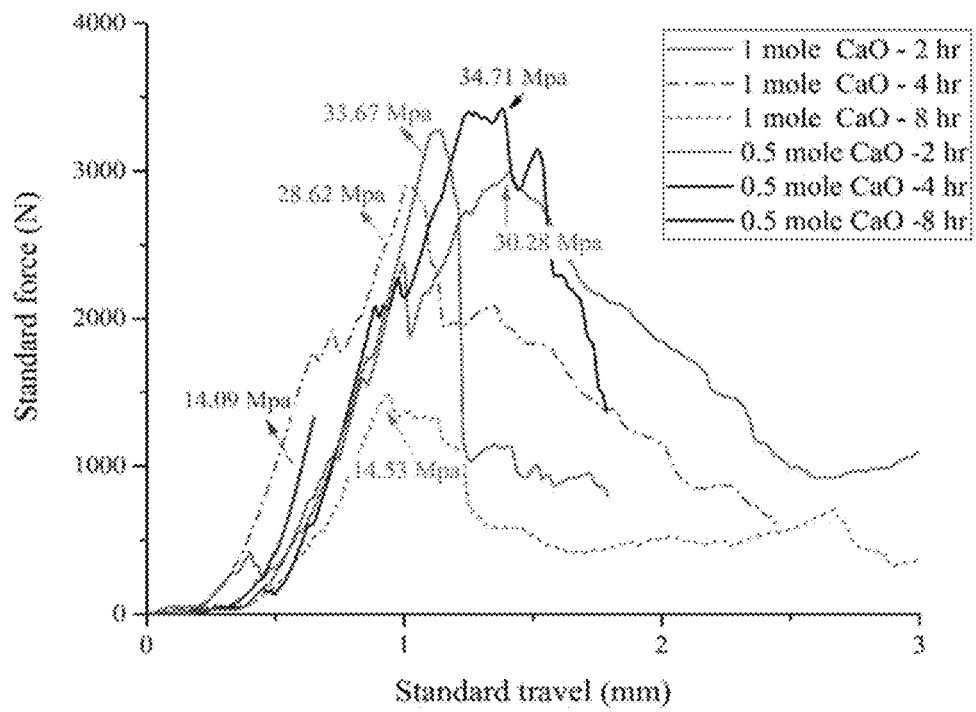

FIG. 16 is a graphical representation of the compressive strength of stoichiometric LMPs and half-stoichiometric LMPs of example 2 reacted for 2 hrs, 4 hrs and 8 hrs.

Figure 17:
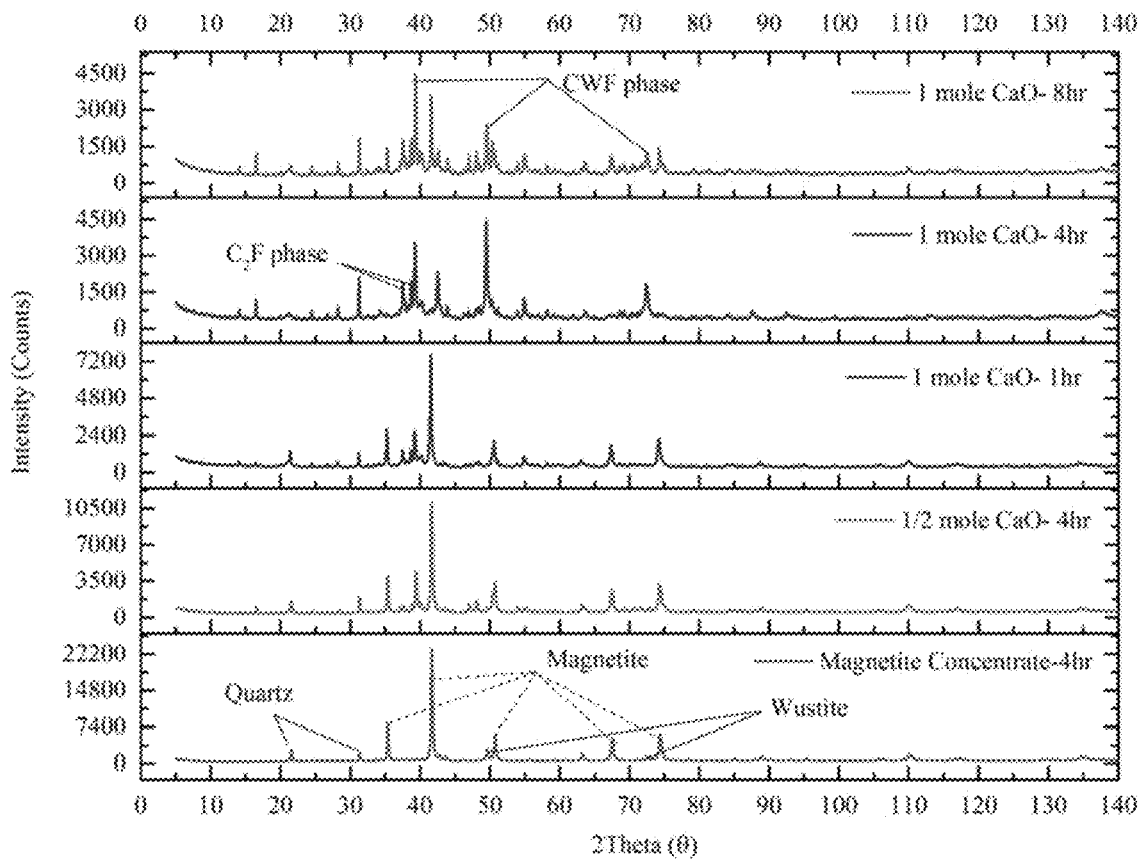

FIG. 17 provides the XRD Analysis of Samples 1 to 5 of example 3; (1) magnetite concentrate reacted for 4 hrs; (2) half-stoichiometric LMP reacted for 4 hrs; (3) stoichiometric LMP reacted for 1 hr; (4) stoichiometric LMP reacted for 4 hrs and (5) stoichiometric LMP reacted for 8 hrs.

Figure 18A:
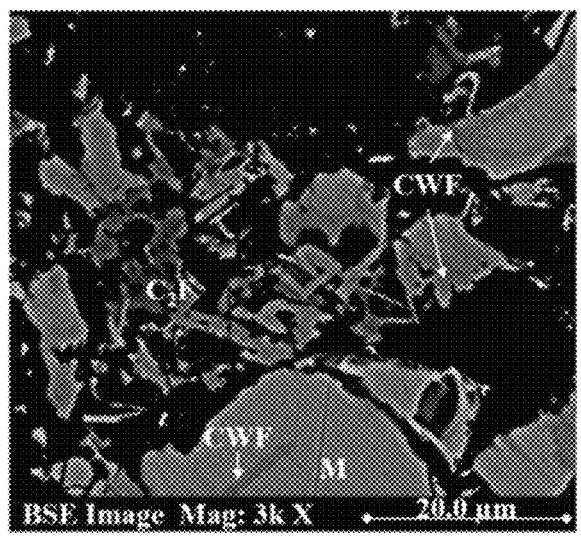

FIG. 18A provides BSE image of sample 2 showing the CWF phase formation on top of magnetite.

Figure 18B:
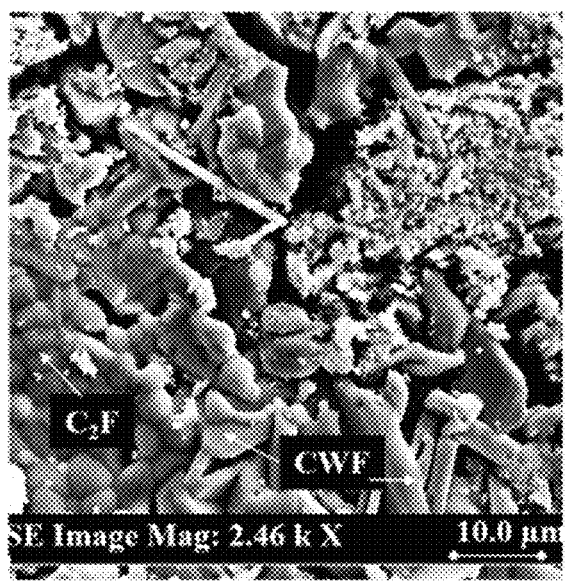

FIG. 18B provides SE micrograph of sample 4 showing the morphology of CWF and $C_2F$.

Figure 18C:
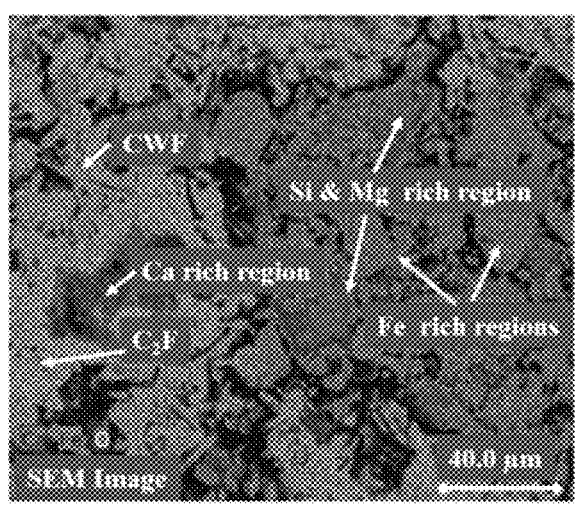

FIG. 18C provides Elemental mapping of sample 5 showing the distribution of different phases.

DETAILED DESCRIPTION

1.0 Notable Features of the Invention

In this initial section of the detailed description, various aspects of the ironmaking feedstock that has been developed by the applicant have been described. Further below in the detailed description (section 2.0 and following), and in the examples, additional information and data is provided to explain features of the ironmaking feedstock, how the key production steps and product features were identified, and to describe the variations in the methods for their production.

The ironmaking feedstock of the present application comprises a $CaFe_3O_5$ phase, which is in solid form at the processing temperatures contemplated in this application. This is generated through the production methods described herein. The $CaFe_3O_5$ phase is a stable phase. The $CaFe_3O_5$ phase, i.e. the CWF phase, is produced through controlled reaction with a calcium source at selected temperatures and reduction potentials which are selected to convert at least a part of the iron, which is predominantly in magnetite form in the starting material ore, into the CWF phase. Depending on the conditions selected, and the desired amount of calcium oxide (lime) in the final feedstock product ready for use in the next stage of ironmaking, there may be partial conversion of the magnetite into the $CaFe_3O_5$ phase, or nearly complete conversion. The experimental work shown below demonstrates a range of examples where there is partial conversion into the $CaFe_3O_5$ phase (some examples have a conversion of about 15% by weight, based on the total of the iron-containing components in the product), while others have conversion to over 85% of $CaFe_3O_5$ by weight based on the iron-containing products. The relative amounts of the various iron-containing components are measured using quantitative phase analysis techniques known to those skilled in the art, using the Rietveld method, unless otherwise indicated. The iron-containing components are those iron-containing phases identified in quantitative phase analysis techniques under the Rietveld method, including the range of iron mineral forms present in the product as shown in the experimental results herein.

Following from the above description, in some embodiments of the ironmaking feedstock product of the present application, $CaFe_3O_5$, constitutes at least 10% by weight of all iron-containing components in the ironmaking feedstock as measured by quantitative phase analysis using the Rietveld method. The amount may be at least 20%, 30%, 40% or 50% by weight of all iron-containing components in the ironmaking feedstock. The amount may be up to 85%, 90%, 95% or there may be complete conversion of the iron-containing components to $CaFe_3O_5$ in the ironmaking feedstock.

If other measurement techniques are relied on, one can measure the amount of $CaFe_3O_5$ in the material used as an ironmaking feedstock (i.e. the treated magnetite), based on the total of that feedstock. Given that the majority of the final treated product is constituted by the iron-containing species, similar % values of $CaFe_3O_5$ as a % of the total material may be produced, such as at least 10%, 20%, 30%, 40% or 50% by of the ironmaking feedstock.

The ironmaking feedstock of the present application will generally be produced in the form of an agglomerate product. The production of a $CaFe_3O_5$ phase contributes to bonding of the material into an agglomerated form. The term "agglomerate" refers to any agglomerated material, and encompasses pellets and sinters in particular. The ironmaking feedstock may be in the form of briquettes. Pellets are well known in the art of the invention, and several ironmaking processes already rely on the use of pellet-form of feed material. Pellets are aggregations of particles formed into pellets through pelletisation or other compression techniques. Sinters are also well known, and are produced by sintering techniques. The ironmaking feedstock of the present application may be formed into pellet form either through pelletisation of the input materials (calcium source and magnetite source), which is then reacted as described herein so as to form a pellet-form treated material, or pelletisation may occur contemporaneously with the application of the reaction conditions.

The analytical results indicate that solid $CaFe_3O_5$ is present at the surface of the pellets formed through the production methods described herein. In the case where there is extensive or complete conversion into $CaFe_3O_5$, then the $CaFe_3O_5$ may be present throughout the pelletised material.

According to some embodiments, the $CaFe_3O_5$ phase is the primary bonding phase.

The analytical results contained herein demonstrate that the ironmaking feedstock of the present application has sufficient compressive strength to withstand crumbling, thus making it suitable for transportation by shipping or otherwise. It is beneficial for the product to withstand crushing and excessive fines production. The compressive strength of the product may be determined qualitatively by those skilled in the art by feel. Otherwise compression strength tests may be performed in accordance with the techniques described herein, or otherwise. The test work in the examples section demonstrate a compressive strength of 14 MPa or more. The compressive strength has been shown to be between 14 MPa and 35 MPa for a range of samples tested. Higher compressive strengths may be achievable for modified forms of the products tested, if those modified forms of ironmaking feedstocks are made in accordance with variations in the production conditions described herein.

To be suitable for use in ironmaking processes, it is desirable for the ironmaking feedstock to be reactive under conventional ironmaking conditions. This may be assessed by measuring the reducibility index of the ironmaking feedstock. In the examples section herein, test samples were subjected to testing to determine their reducibility index, and were found to have a similar reducibility index to two industrial sinter samples used in ironmaking. Testing in this regard should be conducted in accordance with ISO 4695:2015 and ISO7215:2015, scaled down to a 6-7 gram sample size (to provide a comparison to the samples tested in this application). It is possible for the sample size to be 500 g in size, in accordance with the relevant standards, if that volume of material is available. The ironmaking feedstocks produced as described herein were demonstrated to have a reducibility index of at least 10, using the above testing procedure (scaled down to 6-7 gram sample size). This was comparable to the industrial sinter samples tested.

As described in further detail below, the ironmaking feedstock described herein comprises a combination of a calcium source and magnetite that has been subjected to reductive conditions at elevated temperature sufficient to produce the solid $CaFe_3O_5$ phase.

The calcium source can be selected from any suitable source of calcium. Non-limiting examples include calcium carbonate (e.g. limestone), calcium oxide (i.e. quicklime), dolomite (calcium magnesium carbonate) and gypsum (calcium sulphate dihydrate). Limestone and quicklime, collectively with other calcium sources, may be described by the general term "lime". Other forms of calcium source may be used, or combinations of these materials with other oxides and/or hydroxides of calcium, and possibly containing other impurities.

The $CaFe_3O_5$ phase may described as comprising the reduced product of a combination of calcium source and magnetite.

In simple terms, the ironmaking feedstock of the present application may be described as the reduced product of a combination of lime and magnetite.

Considerable research has gone into studying the relative amounts of lime and magnetite that may be used to produce the ironmaking feedstock. Broadly speaking, the molar ratio of lime and magnetite (lime:magnetite) between 0.1:1.0 to 1.2:1.0. Test work was conducted at ratios of 0.5:1.0 and 1.0:1.0. A 20% by weight amount of lime (CaO, specifically) to magnetite produces roughly a stoichiometric ratio (1:1) of lime to magnetite. As described in further detail below, sub-stoichiometric amounts of lime to magnetite may suit subsequent use of the ironmaking feedstock in iron making processes, which rely on less than a stoichiometric amount of lime to iron ore in the reduction unit of metallic iron production. Using a sub-stoichiometric amount of lime impacts on the processing conditions and amount of conversion of the magnetite phase into the CWF form. However, balancing the ironmaking conditions (i.e. metallic iron production from the treated ore) with the pre-treatment conditions for the formation of this ironmaking feedstock may make this more desirable. The molar ratio may be a minimum of 0.1:1, 0.2:1, 0.3:1, 0.4:1, 0.5:1, 0.6:1, 0.7:1 or 0.8:1. The ratio may be a maximum of 1.2:1, 1.1:1, 1:1, 0.9:1, 0.8:1 or otherwise. Any minimum and maximum may be combined without restriction to form a suitable range—the examples demonstrate two values (0.5:1 and 1:1), and varying around these values is viable for the production of ironmaking feedstocks having a range and balance of desirable properties.

As described above, the process for the production of an ironmaking feedstock comprises reacting a combination of a calcium source and magnetite at elevated temperature under reducing conditions sufficient to produce a solid $CaFe_3O_5$ phase.

The examples section demonstrates and uses phase diagrams and test results to demonstrate the impact of the temperature and reduction conditions, and also the ratio of reagents, on the type of product produced. By making variations on the production conditions exemplified, reasonable predictable variations in the product properties can be made, to demonstrate the efficacy of the production process across a broad range of conditions, for the formation of a broad range of useful products.

The reaction conditions are preferably controlled to be sufficient to produce an ironmaking feedstock containing at least 10% $CaFe_3O_5$ by weight with respect to all iron-containing components in the ironmaking feedstock as measured by quantitative phase analysis using the Rietveld method. The reaction conditions may be chosen to be sufficient to produce an ironmaking feedstock containing at least 20%, 30%, 40% or 50% $CaFe_3O_5$, with respect to all iron-containing components in the ironmaking feedstock as measured by quantitative phase analysis using the Rietveld method.

The reaction is conducted at an elevated (high) temperature. Suitable temperatures for conducting the reaction are at least about 500° C., such as between 500° C. and 1150° C. The temperature is preferably at least 550° C., 600° C., 650° C., 700° C., 750° C., 800° C. or at least about 850° C. The temperature is preferably not more than about 1100° C. In some embodiments, the elevated temperature is a temperature between about 850° C. and 1150° C., 850° C. and 1050° C., or between 900° C. and 1000° C.

Depending on the selected temperature, the reducing conditions are selected so as to ensure the production of the CWF phase. The higher the temperature, the higher the partial pressure of oxygen (i.e. lower the reduction potential) that can be used—the lower, the lower the partial pressure of oxygen. This is demonstrated in FIGS. 3, 4 and 5 described in further detail below. In some embodiments, the reducing conditions comprise a $CO_2/CO$ ratio of 1.0 or greater, or a reduction potential of a maximum $9.8 \times 10^{-16}$ or less. It is noted that references to "reduction potentials" measured in such terms relate to the partial pressure of oxygen in the reduction. In some embodiments, the reducing conditions comprise a reduction potential from $6.3 \times 10^{-8}$ to at most $9.8 \times 10^{-16}$ or from $1.6 \times 10^{-10}$ to at most $9.8 \times 10^{-16}$ or from $1.3 \times 10^{-13}$ to at most $9.8 \times 10^{-16}$. A reduction potential between $6.3 \times 10^{-8}$ and $9.8 \times 10^{-16}$ is best suited to higher temperature conditions (e.g. around 1050° C.). A reduction potential that is between $1.6 \times 10^{-10}$ and $9.8 \times 10^{-16}$ is best suited to temperature conditions around 950° C., and a reduction potential between about $1.3 \times 10^{-13}$ and $9.8 \times 10^{-16}$ is best suited to temperature conditions around 850° C. These ranges may suit a range of different relative amounts of calcium source to magnetite, and temperature ranges, or otherwise the oxygen partial pressure should be selected to be within a narrow band to ensure the desired degree of conversion of magnetite phase into the CWF form.

As indicated above, the molar ratio of calcium source to magnetite may be between 0.1:1.0 and 1.2:1.0, or within any suitable sub-range of ratios, such as between 0.4:1.0 and 1.0:1.0. When the molar ratio of calcium source to magnetite is sub- or super-stoichiometric, the reduction potential may be selected to be from $1.3 \times 10^{-11}$ to at most $9.8 \times 10^{-16}$ or from $1.1 \times 10^{-13}$ to at most $9.8 \times 10^{-16}$ or from $4.3 \times 10^{-16}$ to at most $9.8 \times 10^{-16}$. These ranges suit a molar ratio of calcium source to magnetite between 0.4:1 and 0.8:1.0, as one example, and between 0.8:1.0 and 1.1:1.0, as another example. A reduction potential between $1.3 \times 10^{-11}$ and $9.8 \times 10^{-16}$ is best suited to higher temperature conditions (e.g. around 1050° C.). A reduction potential that is between $1.1 \times 10^{-13}$ and $9.8 \times 10^{-16}$ is best suited to temperature conditions around 950° C., and a reduction potential between about $4.3 \times 10^{-16}$ and $9.8 \times 10^{-16}$ is best suited to temperature conditions around 850° C.

The experimental work demonstrates the effect of conducting the reaction (under laboratory conditions) over a range of time periods, from a few minutes up to 8 hours. In transferring to an industrial process, modifications may be made to the time period of the reaction as required, and modifications may be desired depending on whether the reaction is conducted batch-wise or in a continuous process. In general terms, the reaction time period should be selected to achieve the desired degree of production of the CWF phase. Excessive energy usage having no improvement or benefit should be avoided. The time period may in some embodiments be between 20 minutes and 8 hours in length. The time period may be at least 5, 10, 15, 20, 30, 40, 50, 60 or more minutes, and optionally not more than 8 hours, 7 hours, 6 hours, 5 hours, 4 hours, 3 hours, 2 hours, 1 hour or otherwise.

The process for the production of an ironmaking feedstock suitably comprises an agglomeration step. This may be achieved by any process for agglomerating materials, such as a pelletising step or a sintering step. Pelletisation is particularly suitable and has been shown to produce products with good physical properties for subsequent use in iron making.

The pelletising step may comprise pelletising the combination of the calcium source and the magnetite prior to conducting the reaction at elevated temperature under reducing conditions. Alternatively, the pelletisation may be conducted at another time in the procedure.

The process may further comprise any pre-processing steps known in the art for iron ore beneficiation. This may involve processing magnetite-rich ore to yield a magnetite concentrate, and using the magnetite concentrate as the magnetite source for the reaction between the calcium source and the magnetite. The processing may involve separation of the iron ore from gangue materials, upgrading the magnetite content of the ore through any means, or otherwise. Upgrading may be by magnetic separation, as one example. The upgraded magnetite ore may be referred to as a magnetite concentrate. The magnetite concentrate used in the production of the ironmaking feedstock may contain at least 40%, 50%, 55%, 60% or at least 65% of iron.

The process may further comprise producing iron from the ironmaking feedstock. This may be by any process known in the art. The production of iron may be through iron production in a blast furnace or any other alternative iron making technique. The method may involve bath smelting, which may be performed at temperatures between 1400 and 1450° C., by way of example. The process for the production of the ironmaking feedstock from magnetite involves flux addition (limestone), which may enable such additions to be avoided or reduced in the final iron making process.

The present application also extends to the use of a $CaFe_3O_5$-containing material as a feedstock for iron production.

The present application also extends to products produced by the method described herein, and iron produced from the ironmaking feedstock or through the processes described herein.

We now describe the background theory and test work conducted to demonstrate and support the present invention.

2. Thermodynamic Assessments

The thermodynamic stability of CWF phase over a range of composition, temperature and oxygen partial pressure was analysed through analysis of calculated phase diagrams using FactSage 7.2. The solution databases used for this study were FactPS (for pure compounds), FToxide (for solid and liquid oxide solutions) and FSteel (for steel intermetallic compounds). These databases use thermochemical data for pure compounds from JANAF and NBS thermochemical tables. The calcio-ferrite compounds that were not available within the inbuilt database of FactSage such as $CaFe_3O_5$, $CaFe_5O_7$, $Ca_4FegO_{17}$ and $Ca_4Fe_{17}O_{29}$ were added to a new compound database using the thermodynamic data sourced from Hidayat et al.

2.1. Binary Phase Diagram of $Fe_3O_4$ and CaO

Figure 1:
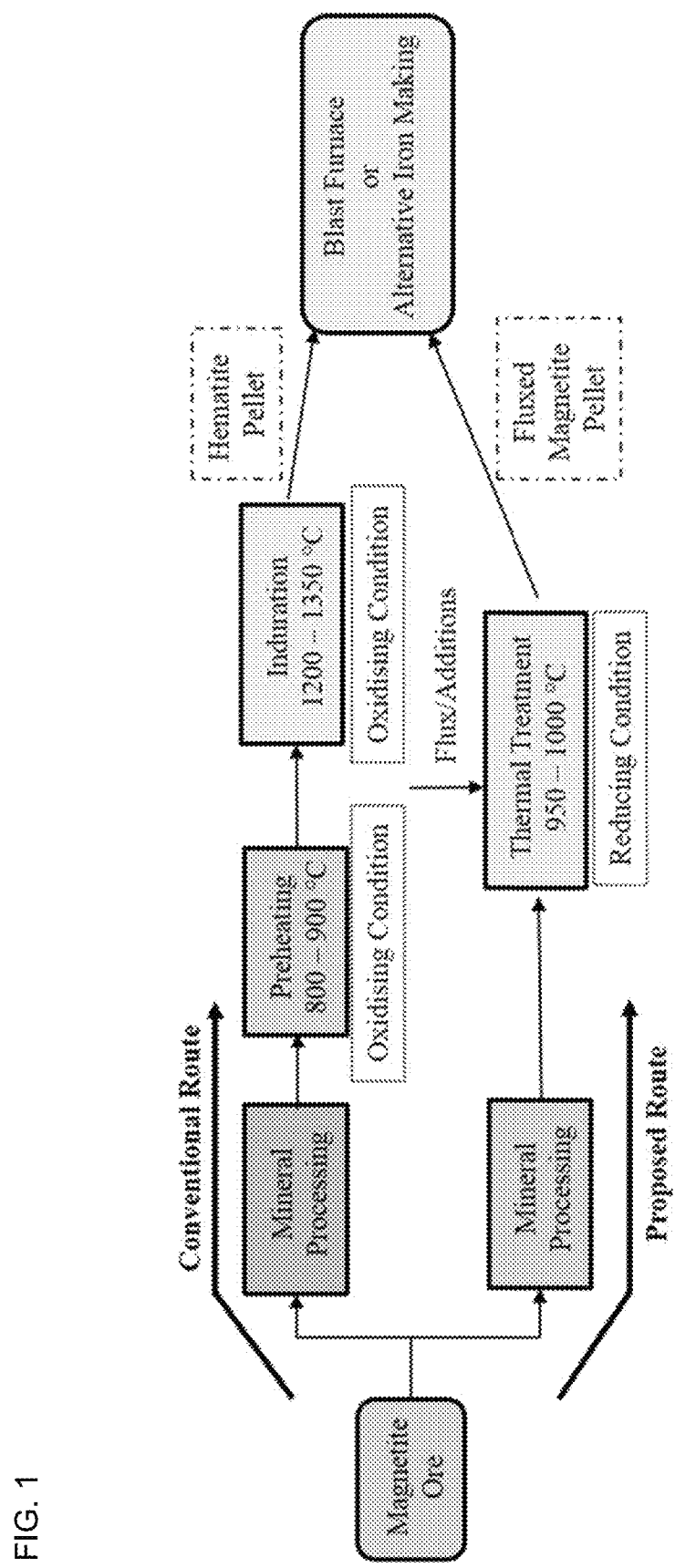
FIG. 1 is a schematic diagram of conventional magnetite processing (top) and the process for the production of an ironmaking feedstock based on magnetite in accordance with preferred embodiments of the present invention (bottom).
Figure 2:
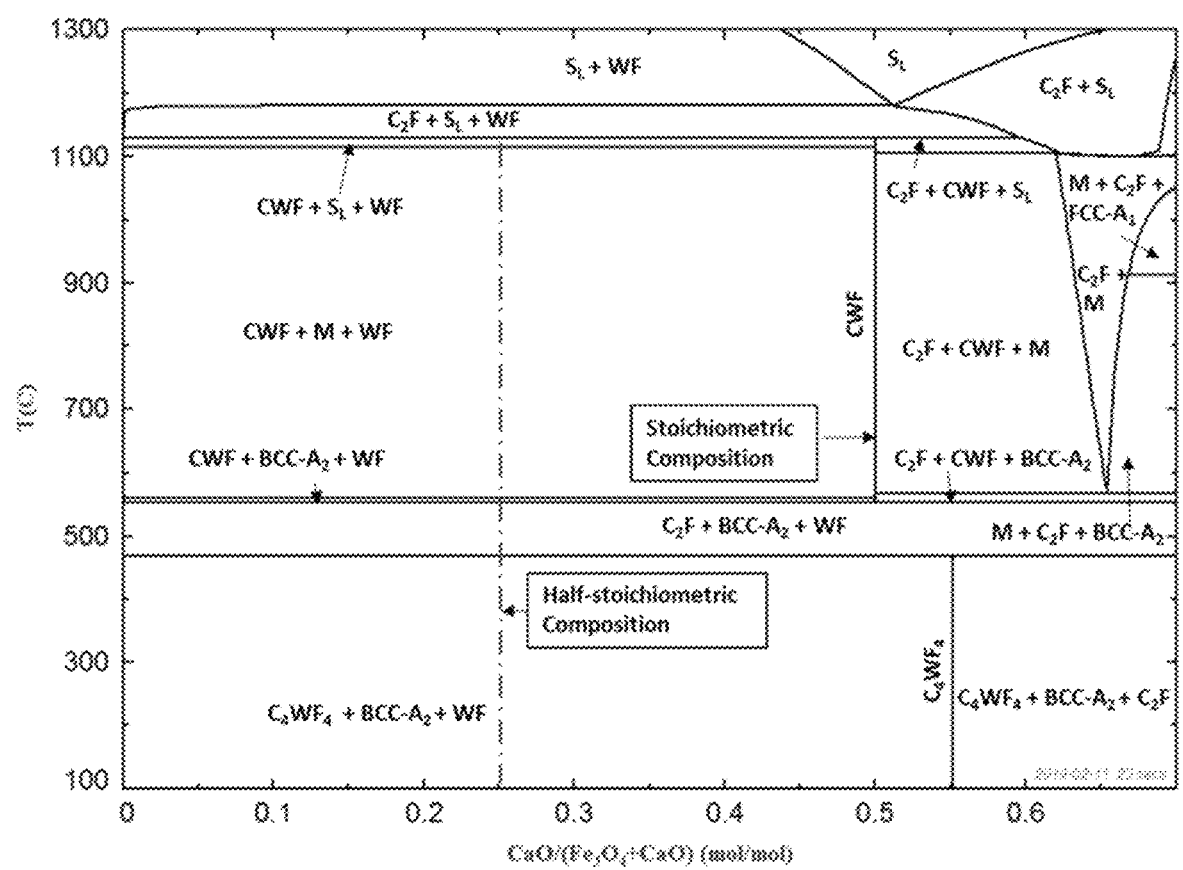
FIG. 2 is a binary phase diagram of $Fe_3O_4$ and CaO.

To understand the stability of calcio-ferrite phases as a function of temperature and composition, the binary phase diagram of $Fe_3O_4$ and CaO was constructed at pressure condition of 1 atmosphere, and the result is presented in FIG. 2. The equilibrium diagram suggests the presence of two calico-ferrite phases: $CaFe_3O_5$ (CWF) and $Ca_2Fe_2O_5$ ($C_2F$). The $C_2F$ phase is reported to have an important role in the formation of the desirable SFCA and SFCA-I bonding phases of sinters and could be an important phase for LMPs. The lime fraction associated with $C_2F$ stability is well above the blast furnace lime addition. Although lime is an essential feed to blast furnace for stabilisation of $SiO_2$ and removal of sulphur, higher percentage of it generates high larger quantity of slag and hence increase the cost of iron production. Considering this, the CWF phase was considered the focus of the study. From the binary phase diagram (FIG. 2), the CWF is a stoichiometric compound of lime and magnetite (1 mole of each, i.e. 19.5 wt. % CaO, balance $Fe_3O_4$) and forms in the temperature range ~540 to 1130° C. following Equation 2 (calculated from FactSage 7.2).

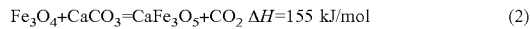

$$Fe_3O_4 + CaCO_3 = CaFe_3O_5 + CO_2 \quad \Delta H = 155 \text{ kJ/mol} \quad (2)$$

Liquid slag starts to form after 1103° C. in the $Fe_3O_4$—CaO system and CWF phase completely dissolves in the slag at about 1130° C. The formation of CWF in the ternary Ca—Fe—O system is well established in the literature. There is a primary liquidus field of CWF in the experimental phase diagram; though the $Fe_3O_4$—CaO join passes only through the very edge of this field that further extends to the left towards the CaO—FeO join. The calculated diagram the $Fe_3O_4$—CaO join passes just outside the CWF liquidus field, which is consistent with the liquidus relations shown in the calculated section of the binary $Fe_3O_4$—CaO. See FIG. 2.

CWF has not been considered previously as a potential phase in iron ore sinters or pellets and hence its suitability for ironmaking. The iron-making industry uses limestone and dolomite as the source of lime and a temperature above 800° C. is required for their decomposition to lime. Hence, the suitable temperature range for CWF formation can be considered between 500 and 1150° C., but preferably within 850 and 1100° C. The binary diagram also indicates a wide composition range for stability of CWF phase along with other phases (monoxide and magnetite on the left and monoxide and $C_2F$ on the right of the stoichiometric line). At the half-stoichiometric composition (i.e. 0.5 mol CaO and 1 mol $Fe_3O_4$ or nearly 10 wt. % CaO), which is similar to the percentage CaO (with respect to iron oxide) in the blast furnace feed, about 55% of CWF phase can be formed. The examples further demonstrate the production of materials, or ironmaking feedstocks, with at least about 10% by weight of CWF phase, and up to 95% of a CWF phase, depending on the desired conditions. A suitable zone, balancing a range of factors, may be about 40% to 70% of a CWF phase in the ironmaking feedstock.

2.2. Temperature vs. Log ($pO_2$) Diagram

Figure 3:
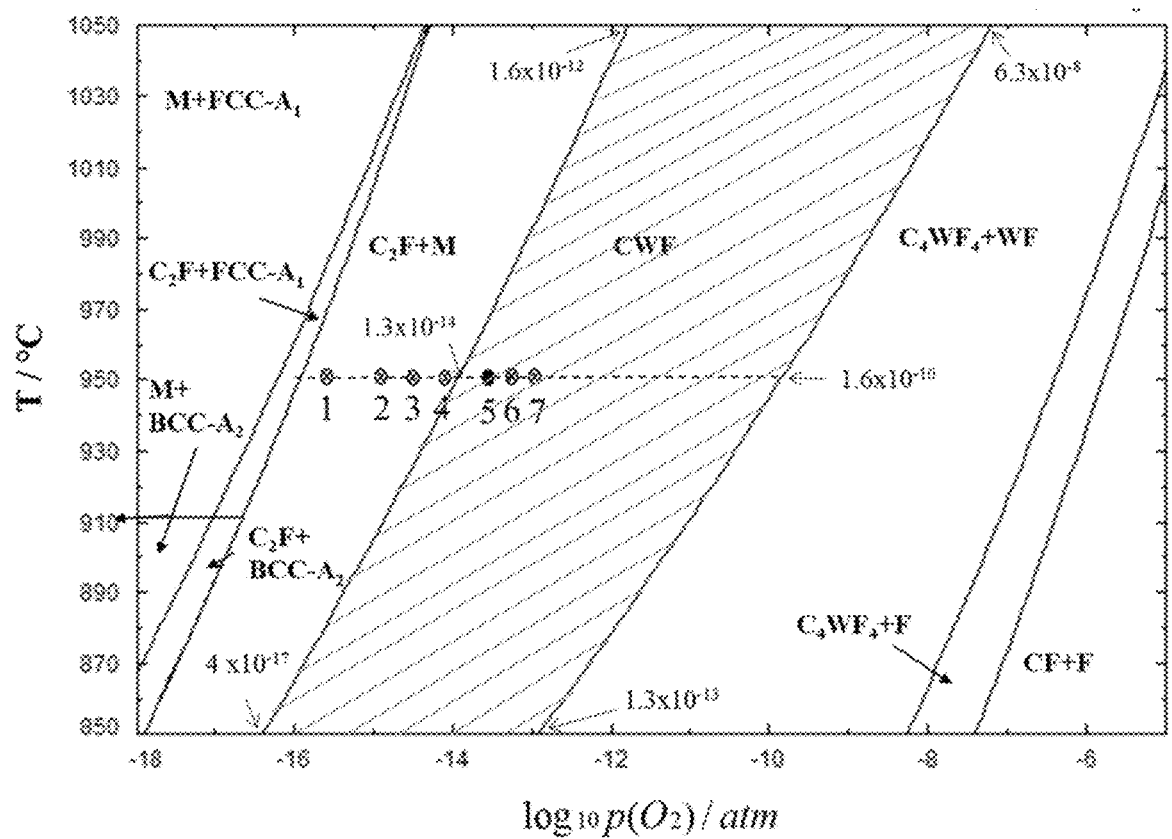
FIG. 3 is a Temperature vs. log $p_{(O)_2}$ diagram at stoichiometric composition (1 mol $Fe_3O_4$ and 1 mol CaO).
Figure 4:
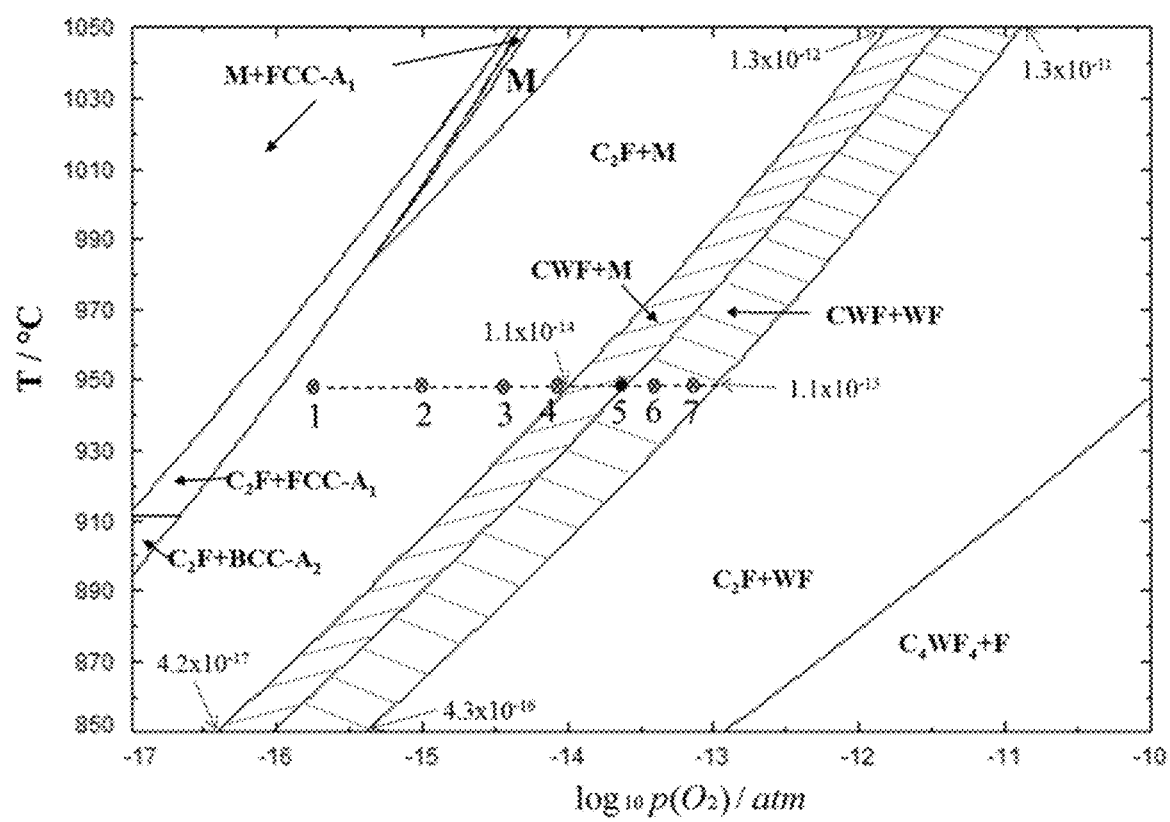
FIG. 4 is a Temperature vs. log $p_{(O)_2}$ diagram at half-stoichiometric composition (1 mol $Fe_3O_4$ and 0.5 mol CaO).
Figure 5:
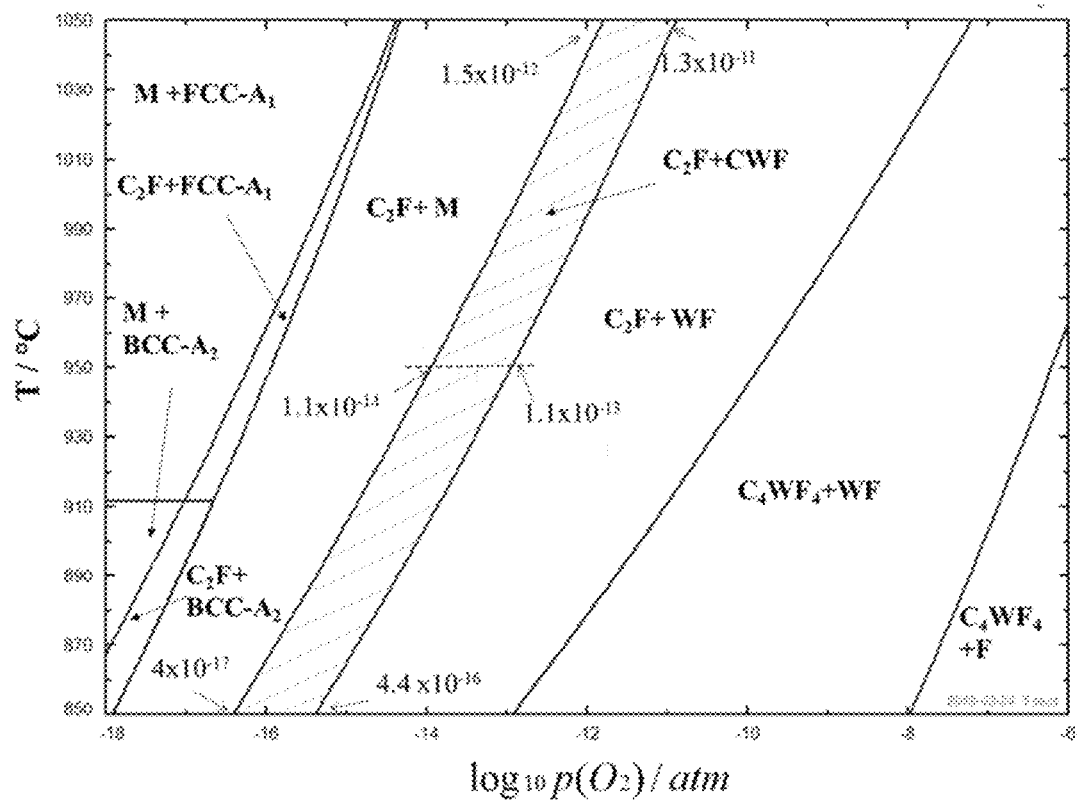
FIG. 5 is a Temperature vs. log $p_{(O)_2}$ diagram at super-stoichiometric composition (1 mol $Fe_3O_4$ and 0.6 mol CaO).

The stability of CWF phase as a function of temperature and reduction potential (i.e. oxygen partial pressure, $pO_2$) at the stoichiometric, half-stoichiometric and super-stoichiometric compositions are shown as shaded area in FIGS. 3, 4 and 5 respectively. The phase diagrams indicate a wide range of $pO_2$ for CWF stability at all temperatures for the stoichiometric composition, while it is narrower for the half-stoichiometric and super-stoichiometric composition. At higher temperatures, a lower reduction potential is required for CWF phase stability and vice versa. The circles annotated on FIGS. 3 and 4 represent the experimental conditions selected for the current study, i.e. T=950° C. at different $pO_2$ values.

From the equilibrium diagrams, the reaction between $Fe_3O_4$ and $CaCO_3$ at 850 to 1100° C. temperature with varying oxygen potential can be written as Equation 3.

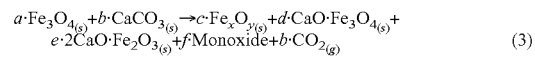

$$a \cdot Fe_3O_{4(s)} + b \cdot CaCO_{3(s)} \rightarrow c \cdot Fe_xO_{y(s)} + d \cdot CaO \cdot Fe_3O_{4(s)} + e \cdot 2CaO \cdot Fe_2O_{3(s)} + f \cdot \text{Monoxide} + b \cdot CO_{2(g)} \quad (3)$$

In Equation 3, a and b are the number of moles of $Fe_3O_4$ and $CaCO_3$ respectively and b a. For a stoichiometric composition of reactants (i.e. when a=b), the number of moles of CWF is at a maximum i.e. a=b=d and c=e=f=0 in the CWF stability region of FIG. 3. For the half-stoichiometric composition and at any fixed temperature, CWF always exists with $Fe_3O_4$ at lower reduction potential and with a monoxide phase (solid solution of FeO, CaO and $Fe_2O_3$) at higher reduction potential. The composition of the monoxide phase varies throughout its stability region and monoxides formed using the stoichiometric composition (FIG. 3) have higher FeO percentages than that in half-stoichiometric composition (FIG. 4).

EXAMPLES

Example 1: Sample Pellet Preparation

Two types of magnetite samples were considered for this study. For the first case, described in Example 2, pure magnetite (98% pure, <5 μm particle size) from Sigma Aldrich was used along with pure limestone (9.5% purity and 5 μm particle size) from Alfa Aesar. For the second case, described in Example 3, magnetite concentrate, containing 1.68% Ca, 5.93% $SiO_2$, 0.60% $Al_2O_3$, 64.4% Fe and 0.85% Mg (% by weight, as per ICP-OES analysis) was used along with limestone.

Two sets of samples were prepared for both cases, one with an equi-molar or stoichiometric composition and other with half-stoichiometric composition.

The samples were mixed together using mortar and pestle and 5% of water was added to the mixture for binding them together. An MTS Electro Magnetic Machine 50 kN Static (Model 43) was used to form cylindrical pellets of uniform dimensions using die of 12.4 mm diameter and constant sample weight of 3 g (±0.5 g). To ensure uniform porosity inside the samples, a compressive load of 2.5 kN was applied to all the mixtures with a uniform loading rate of 0.2 kN/sec and a holding time of 5 sec.

Example 2

CWF Formation from Laboratory Grade Magnetite

The apparatus used for CWF formation consists of a horizontal tube furnace (resistance heated Nabertherm RHTH 120-300/18), a gas flow circuit with mass flow controllers (CFC, Aalborg) and a crucible holder. A schematic of the experimental apparatus is shown in FIG. 6. Pellets produced in Example 1 were subjected to the CWF formation in the apparatus of FIG. 6.

As shown in the phase diagrams (FIGS. 2 to 5), the temperature range of CWF formation is from ~500 to 1150° C., and different ranges of $pO_2$ are required at different temperatures and compositions for CWF stability. For this study, all experiments were carried out at 950° C. and the effects of composition, time and oxygen partial pressure on CWF formation were studied. The details of the experimental conditions are shown in Table 1. Two compositions were chosen for the study: stoichiometric and half-stoichiometric. The effect of reaction time was studied at a constant $pO_2$ by fixing the $CO_2/CO$ ratio at a value of 4. The actual $pO_2$ inside the furnace was measured using a solid-zirconia-electrolyte oxygen sensor ($SIRO_2$ C700+) and is shown by the solid circle labelled as no. 5 in FIGS. 3 and 4. The effect of $pO_2$ on CWF formation was also studied for both stoichiometric and half-stoichiometric samples heated at 950° C. for 30 min and 1 hr. The $pO_2$ value for these experiments are represented by the solid circles numbered 1 to 7 in FIGS. 3 and 4. A $CO_2/CO$ gas flowrate of 150 mL min$^{-1}$ was maintained for all the experiments, however the effect of increased gas flowrate (300 mL min$^{-1}$) were also studied for 950° C.-heated stoichiometric samples.

TABLE 1

Summary of Experiments carried out at 950° C.

| Composition | Flow rate (mL min$^{-1}$) | $CO_2/CO$ | Heating Time (min) |
|---|---|---|---|
| Stoichiometric LMP: 1 mol $Fe_3O_4$ + 1 mol $CaCO_3$ | 150 | 4 | 5, 10, 15, 20, 30, 40, 60, 120, 240, 480, 600 and 720 |
| | 300 | 4 | 10, 20, 30, 40, 60 |
| Half-Stoichiometric LMP: 1 mol $Fe_3O_4$ + 0.5 mol $CaCO_3$ | 150 | 4 | 5, 10, 15, 20, 30, 40, 60, 120, 240, 480, 600 |
| Stoichiometric LMP: 1 mol $Fe_3O_4$ + 1 mol $CaCO_3$ | 150 | 0.35, 1, 2, 3, 4, 6.5, 9 | 30 |
| Half-Stoichiometric LMP: 1 mol $Fe_3O_4$ + 0.5 mol $CaCO_3$ | 150 | 0.35, 1, 2, 3, 4, 6.5, 9 | 30 |

Experiments for Reducibility Measurements

Thermogravimetric analysis (TGA) was used to measure the continuous weight change of the sample with time and the obtained data was used to calculate the reducibility of LMPs following scaled down standardised tests (ISO 4695: 2015 and ISO 7215:2015). A TGA setup was fabricated in the laboratory for analysing reducibility of products from horizontal furnace experiments, which cannot be analysed using commercial TGA setup due to size limitation. The main components of the apparatus (shown in FIG. 7) include a vertical tube furnace (Eurotherm), a gas flow circuit (DFC, Aalborg), an analytical balance (FX-300i with 1 mg accuracy) with enclosure, a data logger with web interface (dataTaker DT85) and a furnace control system. The sample is placed inside an alumina crucible, which is connected to a stainless-steel wire suspended from the balance using a platinum wire. The balance and the stainless-steel rod are enclosed inside an acrylic chamber and brass tubing, respectively, and the brass tubing is then connected to the furnace tube using flanges to seal the whole furnace. The gas control system has a connection to Ar and CO cylinder for regulating the desired atmosphere inside sealed furnace. Reducing gas mixture enters the reactor from the bottom inlet and leaves from the side exit after the reaction. The top acrylic chamber, enclosing the balance, also has an inlet for Ar gas that prevents the upward flowing CO-Ar mixture to enter the chamber and hence any accidental leakage of CO gas.

The experiments were carried out by firstly heating the furnace to the desired temperature, followed by loading samples inside the crucible that is positioned at the level of top water-cooled furnace flange, then sealing the furnace and purging argon gas to maintain neutral atmosphere and finally lowering the crucible (using a lever mechanism attached to the setup) at the high temperature zone the furnace. The temperature within the balance was measured continuously using a K-type thermocouple and was recorded using the data acquisition DT80. The sample mass was recorded using WinCT Plus weighing software, every 0.125 seconds.

The standardised tests (ISO 4695:2015 and ISO 7215: 2015) involve drying 500 g of 10 to 12.5 mm sized samples in an oven at 105±5° C. to a constant mass, followed by isothermal reduction at 950° C. under a gas atmosphere containing 40% CO and 60% N2. The ratio of oxygen removed during the test to the total available oxygen present in the unreacted sample gives the degree of reduction (DR) and the rate of reduction at 40% DR gives the reducibility index [% min$^{-1}$]. The formulae for calculating the DR are given in Equations 4 and 5.

$$DR = \left[\frac{0.111 \times W_1}{0.430 \times W_2} + \frac{(m_1 - m_t)}{m_0 \times 0.430 \times W_2} \times 100\right] \times 100 \quad (4)$$

Where, $m_0$, $m_1$ and $m_t$ are the masses of the test sample before the reduction test, immediately before starting the reaction, and after the specified reduction time t, respectively. $W_1$ is the total $Fe^{2+}$ oxide content in the sample and $W_2$ is the total iron content of the test sample prior to the reduction test.

$$RI = \frac{dR}{dt}(\text{at 40\% Reduction}) = \frac{33.6}{t_{60} - t_{30}} \quad (5)$$

Where, $t_{30}$ and $t_{60}$ are the times to attain a 30% and a 60% degree of reduction, respectively (min).

The standard tests require 500 g of sample, however carrying out tests at such a scale was not feasible for the pure magnetite pellets. Therefore, a scaled down version of the tests was carried out here, using 6-7 g of material in the TGA setup. Initially, the instrumental error of the TGA was calculated by measuring the weight loss of an empty crucible setup at 950° C. The experiment was repeated 9 times and the average weight change was calculated and considered as the instrumental error which was then subtracted from the actual weight loss of the samples. Secondly, a sample weight of 6 g (±0.5 g) of $Fe_2O_3$ (Sigma Aldrich, 99.995% purity) was chosen and the optimum flowrate for the reducibility test was calculated by determining the minimum flowrate after which the reduction rate was not affected. After finding the instrumental error and optimum gas flowrate, the reducibility experiments were conducted for the reacted stoichiometric and half stoichiometric LMPs and also for the industrial grade sinters supplied by Blue-Scope Steel (AIS) Pty Ltd.

XRD and Microscopic Characterisation

The key phases present in the products were investigated using X-ray diffraction (XRD), scanning electron microscopy (SEM) and energy dispersive spectroscopy (EDS). For the XRD analysis, the samples were crushed in a mortar and pestle in order to break up any agglomerates and to ensure homogeneity. They were then applied to low-background plates in PANalytical sample holders for flat plate presentation to the X-ray beam. Diffraction data were collected for 2θ angle from 5-140° using a PANalytical Empyrean instrument fitted with a cobalt long-fine-focus X-ray tube operated at 40 kV and 40 mA. A PIXcel detector was used in scanning line (1D) mode with an active length of 3.3482° 2θ. Data were collected with a nominal step size of 0.0263° 2θ (~1 hour per scan). During data collection, samples were rotated at 15 rpm to improve particle statistics. Phase identification was performed using PANalytical HighScore Plus® software (V4.5) which interfaces with the International Centre of Diffraction Data (ICDD) PDF4+ database. Rietveld refinement-based quantitative phase analysis (QPA) [Bruker A X S, Hill and Howard] was carried out using TOPAS (V6) software. The crystal structure information of Evrard et al., Hamilton, Vanpeteghem et al., Maslen et al., Fjellvåg et al. and Evrard et al. were used as the starting input for the CWF, magnetite, $C_2F$, calcite, wustite and $CW_3F$ structures, respectively. Unit cell parameters, peak width and shape and phase scale factors were allowed to refine, along with the background (which was described using a Chebychev polynomial), in order to achieve the best fit of the calculated model to the experimental XRD data. The phase wt. % values quoted throughout are relative crystalline wt. % values, obtained using the Hill-Howard algorithm [Hill and Howard] which is embodied in TOPAS. The ICDD Codes for the identified phases are mentioned in Table 2.

TABLE 2

ICDD Numbers of identified phases

| Sl. No. | Identified Phases from XRD | ICDD Numbers |
|---|---|---|
| 1 | $CaFe_3O_5$ (CWF) | 04-010-1795 |
| 2 | $Fe_3O_4$ (WF) | 00-019-0629 |
| 3 | $Ca_2Fe_2O_5$ ($C_2F$) | 00-047-1744 |
| 4 | $CaCO_3$ | 00-005-0586 |
| 5 | FeO | 01-089-0687 |
| 6 | $CW_3F$ | 01-072-0892 |

FEI Quanta 400 Field Emission Environmental SEM (ESEM) was used at 15 kV operating voltage and 10 mm working distance for both EDS and microscopy. The EDS analyses were standard less and no calibration standards were used. The samples were coated with a 10-nanometre thick layer of carbon prior to the analysis. As Ca:Fe ratios were needed for distinguishing various calcio-ferrite phases, full standards-based measurements were not needed for his study.

Compressive Strength Measurement

The compressive strength of the samples was measured using ASTM C30/C39M-17a standard test. Zwick Roell 50 kN Universal Testing Machine was used to measure the compressive strengths of 2, 4 and 8 hr heated stoichiometric and half-stoichiometric LMPs across the length of cylindrical pellets. The load was applied at a rate of 10 mm $min^{-1}$ until the fracture of specimen and compressive strength was calculated by dividing cross-sectional area of the sample (mm) to the maximum load (kN). The length to diameter ratio of the reacted LMPs were about 1.1 to 1.2 and corresponding correction factors were calculated and multiplied with the obtained compressive strength to calculate the corrected results.

Weight Loss

The weight loss results from the horizontal furnace experiments (shown in Table 1) are shown in FIG. 8. For both the stoichiometric and half-stoichiometric LMPs the weight loss increased up to about 15 min and no significant change was observed after that. Doubling the flowrate from 150 to 300 mL $min^{-1}$ for stoichiometric LMPs (shown in FIG. 8) did not show any significant variation in weight loss.

Effect of Composition and Heating Time on CWF Formation

XRD patterns collected for the stoichiometric and half-stoichiometric LMPs heated to 950° C. for different times are shown in FIGS. 9A and 9B. The data suggest that decomposition of $CaCO_3$ is incomplete for 5 min-heated samples at 950° C. The formation of CWF and $C_2F$ phases from the consumption of magnetite and limestone is evident in FIGS. 9A AND 9B. $C_2F$ phase forms at the beginning of reaction along with CWF and disappears at longer heating times. $Fe_3O_4$ is completely converted to CWF for the 60 min-heated stoichiometric LMP (FIG. 9A) but is still present for the half-stoichiometric LMP (FIG. 9B), which is consistent with the binary phase diagram.

FIGS. 10A and 10B show the results of Rietveld refinement based QPA for all the 950° C. heated stoichiometric and half-stoichiometric LMPs, respectively. The QPA results are relative weight percentages and do not include any unidentified or amorphous material which may exist in the samples. The graphs indicate the formation of $C_2F$ phase at the beginning of the reaction followed by its immediate decrease concomitant with the increase of the CWF phase. Both the stoichiometric and half-stoichiometric 950° C. heated LMPs showed about 4 and 6% of unreacted limestone, after five minutes of reaction time, respectively. The amount of CWF reaches ~80% within 10 min of reaction time (FIG. 10A). For both the stoichiometric and half-stoichiometric LMPs, the CWF formation reaction appears to be complete after ~60 min of reaction time.

Effect of $pO_2$

The effects of $pO_2$ on CWF formation after 30 min reaction at 950° C. for both stoichiometric and half-stoichiometric samples are shown in FIGS. 11A and 11B. The diffraction patterns in both FIGS. indicate increased CWF phase stability at lower reduction potentials whereas $C_2F$ and FeO are more stable at higher reduction potentials. The detailed comparison of experimental and the thermodynamic model predicted phases are summarised in Table 3.

TABLE 3

Comparison of experimental and modelled phases with varied oxygen partial pressure

| Circle No in FIGS. 3 & 4 | Measured $CO_2/CO$ | $P_{O_2}$ | Phase Diagram Modelled Phases | | Experimentally Obtained Phases | |
|---|---|---|---|---|---|---|
| | | | Stoichiometric LMPs | Half-Stoichiometric LMPs | Stoichiometric LMPs | Half-Stoichiometric LMPs |
| 1 | 0.35 | $1.9 \times 10^{-16}$ | $C_2F + M$ | $C_2F + M$ | $C_2F + FeO$ | $C_2F + FeO$ |
| 2 | 1 | $9.8 \times 10^{-16}$ | $C_2F + M$ | $C_2F + M$ | $CWF + C_2F + CW_3F$ | $CWF + FeO + CW_3F$ |
| 3 | 2 | $4.2 \times 10^{-15}$ | $C_2F + M$ | $C_2F + M$ | $CWF + C_2F + FeO$ | $CWF + FeO$ |
| 4 | 3 | $9.5 \times 10^{-15}$ | $C_2F + M$ | $C_2F + M$ | $CWF + C_2F + FeO$ | $CWF + C_2F + FeO + WF$ |
| 5 | 4 | $2.9 \times 10^{-14}$ | CWF | $CWF + M$ | $CWF + C_2F + WF$ | $CWF + C_2F + WF$ |
| 6 | 6.5 | $5.5 \times 10^{-14}$ | CWF | $CWF + WF$ | $CWF + C_2F + WF$ | $CWF + WF$ |
| 7 | 9 | $9.7 \times 10^{-14}$ | CWF | $CWF + WF$ | $CWF + C_2F + WF$ | $CWF + WF$ |

The experimental results from Table 3 indicate the stability of CWF over a wide range of $pO_2$ at 950° C. and after 30 min reaction time. At lower reduction potential presence of unreacted $Fe_3O_4$ was found for both the stoichiometric and half-stoichiometric compositions (FIGS. 11A and 11B), which was then reduced to FeO at higher reduction potential (i.e. in the $CO_2/CO$ ratio of 2 and 3, as shown in Table 3).

Microstructure Analysis

Effect of Composition

Back Scattered Electron (BSE) micrographs of stoichiometric LMPs heated to 950° C. for 20 min (FIG. 12A) shows the formation of CWF phase (light grey) from the $Fe_3O_4$ phase (bright region). The dark grey region is the $C_2F$ phase, as confirmed by EDS, and it forms adjacent to lime (CaO) (the darkest region). The compositional results from the EDS analyses are summarised in Table 4.

Secondary electron (SE) micrographs of the unpolished stoichiometric and half-stoichiometric LMPs heated to 950° C. for 60 min are shown in FIGS. 12B and 12C. The micrographs indicate a platelet morphology of the CWF phase and a globular shape of the $C_2F$ phase. The half-stoichiometric LMP shows a higher quantity of $Fe_3O_4$ and the stoichiometric LMP shows higher CWF phase with a small amount of $C_2F$ phase, which is consistent with the XRD results. The $C_2F$ transient effect from the Rietveld QPA results of time series experiment (FIGS. 10A and 10B) and the BSE micrographs indicate that the unexpected $C_2F$ phase is a rimming of former limestone particles and represents incomplete equilibration due to limited (inter-)diffusion and the resultant locally higher activity of Ca.

TABLE 4

Summary of compositional results from EDS analysis.

| Phase | Element | Composition (Wt. %) | Total | Composition (At. %) |
|---|---|---|---|---|
| CWF | Ca | 13.9 | 100.8 | 11.1 |
| | Fe | 59.6 | | 34.2 |
| | O | 27.3 | | 54.7 |
| $Fe_3O_4$ | Ca | 1.2 | 97.4 | 1.1 |
| | Fe | 72.4 | | 46.1 |
| | O | 23.8 | | 52.9 |
| $C_2F$ | Ca | 29.9 | 97.2 | 23.2 |
| | Fe | 38.8 | | 21.6 |
| | O | 28.5 | | 55.2 |

Effect of $pO_2$

The effect of $pO_2$ on the microstructure of 950° C.-30 min heated LMPs is shown in FIGS. 13A-13F. At the lower reduction potential of $pO_2=5.5\times10^{-14}$ i.e. at $CO_2/CO$ of 6.5, the morphology of CWF s similar for both half-stoichiometric (FIG. 13A) and stoichiometric compositions (FIG. 13D). At a reduction potential of $pO_2=9.8\times10^{-16}$, i.e. at $CO_2/CO$ of 1, $CW_3F$ phase is observed in the both stoichiometric and half-stoichiometric LMPs (FIG. 13B and FIG. 13E). $CW_3F$ has a rough surface compared to the CWF phase (clearly distinguishable in FIG. 13B and most probably was formed by the reduction of CWF phase at the maintained reduction potential. With further increase in the reduction potential to $p_{O_2}=1.9\times10^{-16}$, i.e. at $CO_2/CO$ of 0.35, $Fe_3O_4$ is reduced to FeO and CWF phase disappears from the micrographs (FIGS. 13C and 13F). The dense FeO phase is attached to the globular $C_2F$ phase and the structure has many open pores.

Reducibility of LMPs

For the scaled down version of ISO standardised reducibility test, a CO (40%) and Ar (60%) gas mixture was utilised as the reducing gas, instead of the CO and N2 mixture. The standardised test requires 50 L min$^{-1}$ gas flowrate for reducing 500 g sample [26, 27]. However, because the scaled down reducibility tests were designed for samples of 6 to 7 g, a 50 L min$^{-1}$ gas flowrate was not appropriate for this lab scale tests. Hence, to find the optimum gas flowrate $Fe_2O_3$ pellets (6±0.5 gm) were reduced under different gas flowrate; the weight loss result is shown in FIG. 14. The graph indicates that flowrates over 400 mL min$^{-1}$ have a negligible effect on the reduction rate (directly related to weight loss, as initial composition of pellet is same) of $Fe_2O_3$. Hence, a flowrate of 400 mL min$^{-1}$ was chosen for the remainder of the reducibility experiments.

The reducibility experiments were carried out for the samples shown in Table 4. Sample 1 consists of stoichiometric LMPs heated at 950° C. for 2, 4 and 8 hrs and sample 2 consists of half-stoichiometric LMPs heated at 950° C. for 2 and 4 hrs; as they have the highest percentage of CWF phase. Sample 3 and 4 are industrial sinter samples obtained from BlueScope Steel (AIS) Pty Ltd with known compositions and reducibilities. The compositions of sample 1 and 2 are known from Rietveld QPA (shown in FIGS. 10A and 10B. From the compositions of sample 1 to 4, the total $Fe^{2+}$ oxide content ($W_1$) and total iron contents ($W_2$) were calculated and these are shown in Table 5.

TABLE 5

Samples for Reducibility Tests

| Sample. No | Composition | $W_2$ (mass %) | $W_1$ (mass %) |
|---|---|---|---|
| 1. 950° C.- Stoichiometric LMP | 2.7 g of 120 min heated sample + 1.81 g of 240 min heated sample + 1.73 g of 480 min heated sample | 58.18 | 24.78 |
| 2. 950° C.- Half-Stoichiometric LMP | 4.65 g of 120 min heated sample + 1.65 g of 240 min heated sample | 63.49 | 27.20 |
| 3. Sinter 1- Dated 25 Dec. 2009 | 57.15% Fe, 7.67% FeO, 10.33% CaO, 5.08% $SiO_2$, 1.79% $Al_2O_3$, 0.91% MgO, 0.46% Mn, 0.10% $TiO_2$ | 57.15 | 7.67 |
| 4. Sinter 2- Dated 15 Feb. 2016 | 56.96% Fe, 8.39% FeO, 9.8% CaO, 5.58% $SiO_2$, 1.70% $Al_2O_3$, 1.25% MgO, 0.40% Mn, 0.25% $TiO_2$ | 56.96 | 8.39 |

The continuous weight loss data from the sample 1 to 4 were used along with $W_1$ and $W_2$ to calculate the degree of reduction using Equation 4. The plot of degree of reduction of the LMPs and industrial sinters vs time is shown in FIG. 15. From FIG. 15, the time taken for 30 and 60% reduction were calculated for all the samples and the results were used to calculate the reducibility index of samples using Equation 5. The obtained reducibility of sinters (shown in Table D) were far less than the reducibility obtained from industrial test, which is obvious because of the different test method. From the industrial test results, reducibility of sinter 2 is about 13.54% less than sinter 1 and that from lab-scale test is about 18.37% indicating about 4-5% deviation from industrial test result. Reducibility of stoichiometric LMPs was found to be higher than the half-stoichiometric LMPs, comparable with sinter 2 and over 20% less than sinter 1.

TABLE 6

Reducibility Index of LMPs and sinters

| Sample | RI | Remarks |
|---|---|---|
| Sinter 1- 2009 Dec. 25 | $\frac{33.6}{347.45 - 110} = 14.15$ | Industrial test shows RI of 65.6 |
| Sinter 2- 2016 Feb. 15 | $\frac{33.6}{422 - 131} = 11.55$ | Industrial test shows RI of 56.72 |
| Stoichiometric LMPs | $\frac{33.6}{390 - 93} = 11.31$ | About 21% less than sinter 1 and 2% less than sinter 2 |
| Half-Stoichiometric LMPs | $\frac{33.6}{430 - 104} = 10.31$ | About 27% less than sinter 1 and 11% less than sinter 2 |

Compressive Strength of LMPs

The results from compressive testing are shown in FIG. 16. A decreasing tend of compressive strength with increase in reaction time was observed for both the stoichiometric and half-stoichiometric LMPs. However, the compressive strength of all the reacted LMPs lies from 14 to 35 MPa, which is in the desirable range for industrial sinters [Sivrikaya and Arol, Muwanguzi et al.].

Example 3

CWF Formation from Magnetite Concentrate

The LMPs were prepared using magnetite concentrate and limestone mineral following the procedures mentioned in Example 1. The LMPs were then subjected to CWF formation in the experimental apparatus (FIG. 6) explained in Example 2. Each of the experiments were carried out at a fixed temperature of 950° C. under reducing conditions, maintained by supplying the $CO_2$:CO gas mixture (4:1) at a flow rate of 150 mL/min. The $pO_2$ inside the furnace was measured using a solid-zirconia-electrolyte oxygen sensor ($SIRO_2$ C700+) and was found to be $2.9 \times 10^{-14}$. The summary of the experiments carried out in this study is shown in Table 7.

TABLE 7

Summary of the experiments carried out on magnetite pellets at 950° C. and $CO/CO_2$ flow rate of 150 mL/min

| Sample No. | Composition | Heating Time (hrs) |
|---|---|---|
| 1 | 1 mole magnetite concentrate (MC) | 4 |
| 2 | 1 mole MC + ½ mole $CaCO_3$ | 4 |
| 3 | 1 mole MC + 1 mole $CaCO_3$ | 1 |
| 4 | 1 mole MC + 1 mole $CaCO_3$ | 4 |
| 5 | 1 mole MC + 1 mole $CaCO_3$ | 8 |

The pellets, after 1 to 8 hrs of thermal treatment, came out hard and there was no evidence of friability. The pellets were potentially transportable, however, they might be too dense to be reactive enough for subsequent ironmaking processes. The phase and microstructure analysis of all the reaction products were carried out for better understanding of their microstructural properties.

XRD Analysis:

For XRD analysis, the samples were crushed and mixed in a mortar (to ensure homogeneity) before placing inside the specimen holder. Diffraction data were collected with a nominal step size of 0.03° 2θ using a PANalytical MPD instrument fitted with a cobalt long-fine-focus X-ray tube operated at 40 kV and 40 mA. All of the products were characterised for qualitative and quantitative phase analysis and the comparison of the results are shown in FIG. 17 and Table 8.

TABLE 8

Quantitative Phase Analysis (Rietveld Analysis) of the products 1 to 5

| Sample No. | Larnite $Ca_2SiO_4$ | $SaFe_3O_5$ | Calcite $CaCO_3$ | Lime CaO | Magnesite $(Mg, Ca)CO_3$ | Magnetite $A^{2+}B^{3+}_2O^{2-}_4$ | Portlandite $Ca(OH)_2$ | Quartz $SiO_2$ | $Ca_2Fe_2O_5$ | Wustite FeO | Total Fe | % CWF |
|---|---|---|---|---|---|---|---|---|---|---|---|---|
| 1 |     |      |     |     |     | 85.7 |     | 2.7 | 1.2  | 10.4 | 97.3 | —  |
| 2 | 2.4 | 29.0 |     |     |     | 56.3 |     | 3.3 | 6.8  | 2.3  | 94.4 | 31 |
| 3 |     | 13.4 |     | 0.8 | 1.1 | 59.1 | 2.9 | 3.8 | 18.9 |      | 91.4 | 15 |
| 4 |     | 19.3 | 1.6 | 2.4 | 2.5 | 1.9  | 2.1 | 7.3 | 29.8 | 33.1 | 84.1 | 23 |
| 5 | 10.2| 29.0 |     | 1.8 |     | 20.3 | 1.3 | 5.7 | 21.0 | 10.7 | 81   | 36 |

The XRD analysis of the preliminary experimental products with industrial ore suggests that CWF phase can be easily formed by reacting magnetite ore with limestone. The stoichiometric LMPs (Sample no 3, 4 and 5) suggests an increasing trend of CWF weight fraction with increase in reaction time. However, the wt. % CWF in sample 4 was less than that of sample 2 irrespective of higher limestone addition and same residence time. This could be because of the non-homogeneity of reactant mixture that is allowing the formation of $C_2F$ phase at the areas of higher lime concentration and preventing the formation of CWF phase. This is also supported by the SEM micrographs presented in the following section. Compositions of other compounds such as $Fe_3O_4$, FeO and $SiO_2$ in the products suggests that the results are inconsistent probably because of inhomogeneous reactant mixture and varying reduction potential. The results of Example 3 show higher amounts of CWF formation under the conditions of those experiments.

SEM Analysis:

The samples were characterised using scanning electron microscopy with energy dispersive X-ray spectroscopy (EDX) for microstructure and chemical characterisation. The back scattered electron (BSE) micrograph of sample 2 (1 mole MC and % mole limestone heated at 950° C. for 4 hrs), the secondary electron (SE) micrograph of sample 4 and elemental mapping results from sample 5 (1 mole MC and 1 mole limestone heated at 950° C. for 8 hrs) are shown in FIGS. 18A-18C respectively.

FIGS. 18A-18C shows the complexity of the product microstructure. Formation of CWF phase from the magnetite surface is clearly evident from the BSE image (FIG. 18A). The EDX results confirms the globular shapes (in the SE image, FIG. 18B) to be $C_2F$ phase and platelet shapes to be CWF phase. From the elemental mapping (FIG. 18C), it is clear that the $C_2F$ phase is formed surrounding the area of higher unreacted CaO concentration. The distinguishable morphologies of the different phases suggest their possible variation in reducibility, which could impact the overall reducibility of magnetite ore in a positive manner.

REFERENCES

M. Davies and M. Twining, Magnetite: South Australia's potential, MESA Journal, 2018, 86, pages 30-44.

S. Forsmo, S.-E. Forsmo, P.-O. Samskog, and B. Bjorkman, "Mechanisms in oxidation and sintering of magnetite iron ore green pellets", Powder technology, vol. 183, no. 2, 2008, pp. 247-259.

P. C. Hayes, "Analysis of Product Morphologies and Reaction Mechanisms on Gaseous Reduction of Iron Oxides," Steel Research International, Vol. 82, No. 5, 2011, pp. 480-493.

B. Deo, R. K. Dube and S. Chatterji, "Formation of Porous Magnetite in the initial stages of solid state reduction of Hematite by Metallic iron". ISIJ International, Vol. 29, No. 4, 1989, pp. 345 347.

A. Abdelghany, D. Q. Fan, M. Elzohiery and H. Y. Sohn, "Flash Iron-making From Magnetite Concentrate Using a Large-Scale Bench Reactor: Experimental and CFD Work", AISTech conference proceedings, 2018.

K. Meijer, C. Guenther, R. J. Dry. and A. G. Saarstahl, "Hlsarna pilot plant project", Proc. 1st Int. Conf. on 'Energy efficiency and $CO_2$ reduction in the steel industry', Dussedorf, Germany, 2011.

B. Anameric and S. K. Kawatra, "Direct iron smelting reduction processes", Mineral Processing and Extractive Metallurgy Review, Metall. Rev., 30, 2009, pp 1-51.

O. Evrard, B. Malaman, F. Jeannot, A. Courtois, H. Alebouyeh, R. J. Gerardin, "Mise en évidence de $CaFe4O6$ et détermination des structures cristallines des ferrites de calcium $CaFe_{2+n}O_{4+n}$ (n=1, 2, 3): nouvel exemple d'intercroissanc". J. Solid State Chem, 1980, 35, 112-119.

ISO 4695:2015 (2015): Iron ores for blast furnace feedstocks—"Determination of the reducibility by the rate of reduction index". International Organization for Standardization, Geneva: 12.

ISO 7215:2015 (2015): "Iron ores for blast furnace feedstocks—Determination of the reducibility by the final degree of reduction index". International Organization for Standardization, Geneva: 11.

Bruker A X S (2013). TOPAS V5: "General Profile and Structure Analysis Software for Powder Diffraction Data". Version 5.

R. J. Hill & C. J. Howard, "Quantitative phase analysis from neutron powder diffraction data using the Rietveld method," J. Appl. Cryst. Vol. 20, 1987, pp. 467-474.

H. M. Rietveld, "A profile refinement method for nuclear and magnetic structures," J. Appl. Cryst., Vol. 2, pp. 65-71.

W. C. Hamilton, "Neutron diffraction investigation of the 119 K transition in magnetite," Phys. Rev., 1958, Vol. 110, pp. 1050-1057.

C. B. Vanpeteghem, R. J. Angel, J. Zhao, N. L. Ross, G. J. Redhammer, F. Seifert, Phys. Chem. Miner. 2008, Vol. 35, pp. 493-504.

E. N. Maslen, V. A. Strel'tsov, N. R. Strel'tsova and N. Ishizawa, Acta Crystallogr. B, 1995, Vol. 51, pp. 929.

H. Fjellvåg, F. Grønvold, S. Stolen, and B. C. Hauback, "On the crystallographic and magnetic structures of nearly stoichiometric iron monoxide," J. Solid State Chem, 1996, Vol. 124, pp. 52-57.

ASTM C39/C39M (2005): "Standard test method for compressive strength of cylindrical concrete specimens". ASTM International, Pennsylvania.

O. Sivrikaya and A. I. Arol, "The bonding/strengthening mechanism of colemanite added organic binders in iron ore pelletization," International Journal of Mineral Processing, vol. 110, pp. 90-100, 2012.

The invention claimed is:

1. A process for the production of an ironmaking feedstock for ironmaking, the process comprising reacting a combination of a calcium source and magnetite, having a molar ratio of calcium to magnetite of between 0.1:1.0 and 0.8:1.0, at elevated temperature under reducing conditions sufficient to produce an ironmaking feedstock comprising a solid $CaFe_3O_5$ phase.

2. The process of claim 1, wherein the magnetite in the combination is present in a magnetite concentrate.

3. The process of claim 2, further comprising processing an iron ore to yield the magnetite concentrate, and combining the magnetite concentrate with the calcium source to form the combination of a calcium source and magnetite.

4. The process of claim 1, wherein the molar ratio of calcium to magnetite is between 0.2:1.0 and 0.8:1.0.

5. The process of claim 1, wherein the molar ratio of calcium to magnetite is between 0.4:1.0 and 0.8:1.0.

6. The process of claim 5, wherein the reducing conditions comprise a partial pressure of oxygen from $1.3 \times 10^{-11}$ atm to $9.8 \times 10^{-16}$ atm.

7. The process of claim 1, wherein the ironmaking feedstock comprises at least 10% $CaFe_3O_5$ by weight with respect to all iron-containing components in the ironmaking feedstock as measured by quantitative phase analysis using the Rietveld method.

8. The process of claim 1, wherein the elevated temperature is a temperature between about 850° C. and 1050° C.

9. The process of claim 1, wherein the reducing conditions comprise a partial pressure of oxygen from $6.3 \times 10^{-8}$ atm to $9.8 \times 10^{16}$ atm.

10. The process of claim 1, wherein the reaction is conducted over a time period of between 20 minutes and 8 hours.

11. The process of claim 1, comprising an agglomeration step to produce the ironmaking feedstock as an agglomerated product.

12. The process of claim 1, comprising a pelletising step to produce the ironmaking feedstock in the form of pellets.

13. The process of claim 12, wherein the pelletising step comprises pelletising the combination of the calcium source and the magnetite prior to conducting the reaction at elevated temperature under reducing conditions.

14. The process of claim 12, wherein the solid $CaFe_3O_5$ is present at the surface of the pellets after reacting the combination of a calcium source and magnetite.

15. The process of claim 12, wherein the pellets have a compressive strength of at least 14 MPa after reacting the combination of a calcium source and magnetite.

16. The process of claim 1, wherein the calcium source is selected from the group consisting of calcium carbonate, calcium oxide, dolomite, gypsum and combinations thereof.

17. The process of claim 1, further comprising producing iron from the ironmaking feedstock.

18. The process of claim 17, wherein the ironmaking feedstock is reduced to iron in a blast furnace.

* * * * *